US009734437B2

(12) United States Patent
Kadota

(10) Patent No.: US 9,734,437 B2
(45) Date of Patent: Aug. 15, 2017

(54) COMMUNICATION RELAYING TECHNOLOGY AND COMMUNICATION RELAYING APPARATUS

(71) Applicant: Masatoshi Kadota, Takahama (JP)

(72) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/083,497

(22) Filed: Nov. 19, 2013

(65) Prior Publication Data
US 2014/0139878 A1 May 22, 2014

(30) Foreign Application Priority Data

Nov. 19, 2012 (JP) ................................. 2012-253270

(51) Int. Cl.
*G06F 3/0482* (2013.01)
*G06F 3/12* (2006.01)
(Continued)

(52) U.S. Cl.
CPC ......... *G06K 15/183* (2013.01); *G06F 3/1205* (2013.01); *G06F 3/1236* (2013.01);
(Continued)

(58) Field of Classification Search
CPC .... G06F 3/1205; G06F 3/1209; G06F 3/1236; G06F 3/1253; G06F 3/1285;
(Continued)

(56) References Cited

U.S. PATENT DOCUMENTS 5,580,177 A * 12/1996 Gase ...................... G06F 3/1204
358/1.15
6,157,950 A * 12/2000 Krishnan ............ H04L 12/4604
709/223
(Continued)

FOREIGN PATENT DOCUMENTS

CN          1782980 A     6/2006
JP       2001290812 A    10/2001
(Continued)

OTHER PUBLICATIONS

Mitchell, Andrew, IPP USB Specification, Draft Date: Apr. 29, 2011, Version 1.0.*
(Continued)

*Primary Examiner* — Chad Dickerson
(74) *Attorney, Agent, or Firm* — Banner & Witcoff, Ltd.

(57) ABSTRACT

A non-transitory computer-readable medium having a communication relaying program which, when executed by a computer of an information processing apparatus, causes the information processing apparatus to perform operations including: generating a communication path unique for an image processing apparatus; generating selection screen information for displaying a screen for receiving selection of identification information of the image processing apparatus, the selection screen information being configured to, in response to selection of the identification information, allow a client application to transmit a processing request with designating the communication path for the image processing apparatus identified by the selected identification information; transmitting the selection screen information to the client application; receiving the processing request from the client application; and transmitting the processing request to the image processing apparatus corresponding to the communication path designated by the processing request.

20 Claims, 12 Drawing Sheets

(51) Int. Cl.
*G06K 15/02* (2006.01)
*G06K 15/00* (2006.01)

(52) U.S. Cl.
CPC .......... *G06F 3/1253* (2013.01); *G06F 3/1288* (2013.01); *G06F 3/1292* (2013.01); *G06K 15/007* (2013.01)

(58) Field of Classification Search
CPC .... G06F 3/1286; G06F 3/1287; G06F 3/1288; G06F 3/1292; G06F 3/1293; G06F 3/1294; H04N 1/00209; H04N 1/00233; G06K 15/007
USPC ............. 358/1.11–1.18, 400–404; 710/8–20; 719/321, 327
See application file for complete search history.

(56) References Cited

U.S. PATENT DOCUMENTS

| | | | |
|---|---|---|---|
| 6,931,456 B2* | 8/2005 | Payne et al. ............... 710/9 | |
| 7,295,338 B2 | 11/2007 | Satake et al. | |
| 8,228,531 B2* | 7/2012 | Kanamori ............ B41J 2/17566 358/1.13 | |
| 8,458,292 B2 | 6/2013 | Polis et al. | |
| 2002/0052935 A1* | 5/2002 | Paxhia .................... H04L 29/06 709/220 | |
| 2002/0080391 A1* | 6/2002 | Sugiura et al. ............. 358/1.15 | |
| 2002/0196463 A1* | 12/2002 | Schlonski ............ G06F 3/1204 358/1.15 | |
| 2003/0030843 A1 | 2/2003 | Qiao | |
| 2003/0189722 A1* | 10/2003 | Yoshikawa ........... G06F 3/1205 358/1.15 | |
| 2003/0197890 A1 | 10/2003 | Satake et al. | |
| 2003/0227641 A1 | 12/2003 | Edmonds et al. | |
| 2004/0130746 A1* | 7/2004 | Wu .................... H04N 1/00278 358/1.15 | |
| 2004/0190042 A1* | 9/2004 | Ferlitsch ............ H04N 1/00233 358/1.15 | |
| 2004/0252333 A1* | 12/2004 | Blume et al. ................. 358/1.15 | |
| 2005/0141007 A1* | 6/2005 | Shirai .................... G06F 3/0486 358/1.13 | |
| 2005/0248803 A1* | 11/2005 | Ohara ......................... 358/1.15 | |
| 2006/0033944 A1* | 2/2006 | Kadota ................. G06F 3/1207 358/1.13 | |
| 2006/0114499 A1 | 6/2006 | Sumita et al. | |
| 2006/0142005 A1* | 6/2006 | Takaluoma ............. G06F 9/542 455/435.1 | |
| 2007/0003308 A1* | 1/2007 | Kim ................. 399/81 | |
| 2007/0211310 A1* | 9/2007 | Kadota ............. H04N 1/00344 358/474 | |
| 2007/0268838 A1* | 11/2007 | Moon ..................... H04L 45/02 370/254 | |
| 2008/0140811 A1* | 6/2008 | Welch ................ H04L 12/4625 709/219 | |
| 2008/0252944 A1 | 10/2008 | Otsuka | |
| 2008/0297833 A1 | 12/2008 | Hatakeyama | |
| 2009/0175200 A1* | 7/2009 | Abe .................... H04L 12/2809 370/254 | |
| 2010/0097632 A1* | 4/2010 | Hattori .................. G06F 21/608 358/1.15 | |
| 2011/0019226 A1 | 1/2011 | Tsujimoto | |
| 2011/0093621 A1* | 4/2011 | Aritomi ............. H04L 12/2809 710/12 | |
| 2011/0292424 A1* | 12/2011 | Murata ................. G06F 3/1214 358/1.13 | |
| 2011/0302512 A1 | 12/2011 | Ishii | |
| 2012/0026548 A1* | 2/2012 | Nakagawa .................... 358/1.15 | |
| 2012/0030690 A1* | 2/2012 | Kakitsuba ............ G06F 3/1204 719/327 | |
| 2012/0133967 A1* | 5/2012 | Yasui .................... G06F 9/4411 358/1.13 | |
| 2013/0054744 A1* | 2/2013 | Akuzawa .......... G06F 17/30876 709/217 | |
| 2013/0100486 A1* | 4/2013 | Mccoog ................ G06F 3/1204 358/1.15 | |
| 2013/0201519 A1 | 8/2013 | Duyk et al. | |
| 2014/0139877 A1 | 5/2014 | Ohara | |

FOREIGN PATENT DOCUMENTS

| | | | | |
|---|---|---|---|---|
| JP | 2003-316712 A | 11/2003 | | |
| JP | 2005346584 A | 12/2005 | | |
| JP | 2007128215 A | 5/2007 | | |
| JP | 2007156614 A | 6/2007 | | |
| JP | 2008252537 A | 10/2008 | | |
| JP | 2010-176580 A | 8/2010 | | |
| JP | 2011-257945 A | 12/2011 | | |
| JP | WO 2012108547 A2 * | 8/2012 | .......... G06F 3/1204 | |
| JP | 2012220997 A | 11/2012 | | |

OTHER PUBLICATIONS

Andrew R. Mitchell, IPP USB Specification (IPP over USB), Version 1.0 Draft 20 revised May 10, 2011.
Co Pending U.S. Appl. No. filed Nov. 19, 2013.
Oct. 24, 2014—(US) Non-Final Office Action—U.S. Appl. No. 14/083,481.
Extended European Search Report issued in corresponding European Patent Application No. 13193544.7 dated Jun. 30, 2014.
Andrew R. Mitchell, "IPP USB Specification (IPP over USB)", Version 1.0 Draft 19, dated Apr. 29, 2011; Retrieved from the Internet: URL:ftp.pwg.org/pub/pwg/ipp/whitepaper/draft-ip-pusbspecification-20110428.pdf [retrieved on May 28, 2014]; 20 pages.
Apr. 8, 2015—(US) Final Office Action—U.S. Appl. No. 14/083,481.
Jun. 9, 2015—(US) Notice of Allowance—U.S. Appl. No. 14/083,478.
Jan. 28, 2015—(US) Non-Final Office Action—U.S. Appl. No. 14/083,478.
Feb. 29, 2016—(CN) Office Action—App 201310583548.9.
Sep. 6, 2016—JP Office Action—JP App 2012-253270.
Aug. 23, 2016—(JP) Office Action—App No. JP2012-253271.

* cited by examiner

FIG. 7

```
<html>
<head>
<title>PRINTER SELECTION SCREEN</title>
</head>
<body>

・・・ OMISSION ・・・

<a href="http://localhost/main.html:4001">PRINTER3a</a>
<a href="http://localhost/main.html:4002">PRINTER3b</a>
<a href="http://localhost/main.html:4003">PRINTER3c</a>

・・・ OMISSION ・・・

</body>
</html>
```

COMMUNICATION RELAYING TECHNOLOGY AND COMMUNICATION RELAYING APPARATUS

CROSS-REFERENCE TO RELATED APPLICATIONS

This application claims priority from Japanese Patent Application No. 2012-253270 filed on Nov. 19, 2012, the entire subject matter of which is incorporated herein by reference.

TECHNICAL FIELD

Illustrative aspects of the present invention relate to a communication relaying technology.

BACKGROUND

There has been disclosed a technology for providing a web server function to an image processing apparatus and for displaying a setting screen and the like of the image processing apparatus on a web browser executed in a terminal device.

Further, there has been known a standard referred to as Internet Printing Protocol (IPP) for connecting an image processing apparatus and a terminal device via the Internet and controlling the image processing apparatus through the Internet such that the image processing apparatus processes images.

Further, there has been known a draft (Version 1.0 Draft 20 as of Nov. 19, 2012) of a standard referred to as "IPP over USB" for performing communication in accordance with the above-described IPP in an environment in which an image processing apparatus and a terminal device are connected to each other by a Universal Serial Bus (USB).

SUMMARY

In "IPP over USB", a communication relaying program is executed by the terminal device. A client application such as a web browser transmits a processing request for the image processing apparatus to the communication relaying program according to IPP. Upon receiving the processing request from the client application, the communication relaying program transmits the processing request to the image processing apparatus connected to the terminal device, according to a USB communication protocol.

In the draft of "IPP over USB", it is also described to provide an HyperText Transport Protocol (HTTP) server function to an image processing apparatus and manage the settings of the image processing apparatus according to a HTTP protocol.

By the way, a configuration in which a terminal device performs communication with a plurality of image processing apparatuses on the occasion of implementing "IPP over USB" may be considered. However, in the related art, when a processing request is transmitted from a client application to a communication relaying program, for example, a configuration to specify one of a plurality of image processing apparatuses as the transmission destination of the processing request has not been considered.

Therefore, illustrative aspects of the present invention provide a technology capable of specifying an image processing apparatus as a transmission destination of a processing request transmitted from a client application in a case of relaying communication between the client application and a plurality of image processing apparatuses.

According to one illustrative aspect of the present invention, there is provided a non-transitory computer-readable medium having a communication relaying program stored thereon and readable by a computer of an information processing apparatus, which is configured to be connectable to an image processing apparatus through a communication interface. The communication relaying program, when executed by the computer, causes the information processing apparatus to perform operations comprising: a communication path generating process of generating a communication path unique for the image processing apparatus; a screen information generating process of generating selection screen information for displaying a screen for receiving selection of identification information of the image processing apparatus, the selection screen information being configured to, in response to selection of the identification information, allow a client application to transmit a processing request with designating the communication path for the image processing apparatus identified by the selected identification information; a screen information transmitting process of transmitting the selection screen information generated by the screen information generating process to the client application; a request receiving process of receiving the processing request from the client application; and a request transmitting process of transmitting the processing request received by the request receiving process to the image processing apparatus corresponding to the communication path designated by the processing request.

The technology can be implemented in a variety of forms such as a communication relaying system, a communication relaying apparatus, a communication relaying method, and a recording medium having a communication relaying program recorded thereon.

BRIEF DESCRIPTION OF THE DRAWINGS

FIG. 7 is a schematic diagram illustrating screen data of the printer selection screen;

DETAILED DESCRIPTION

Exemplary embodiments will be described with reference to FIGS. 1 to 12.

(1) Image Processing System

Figure 1:
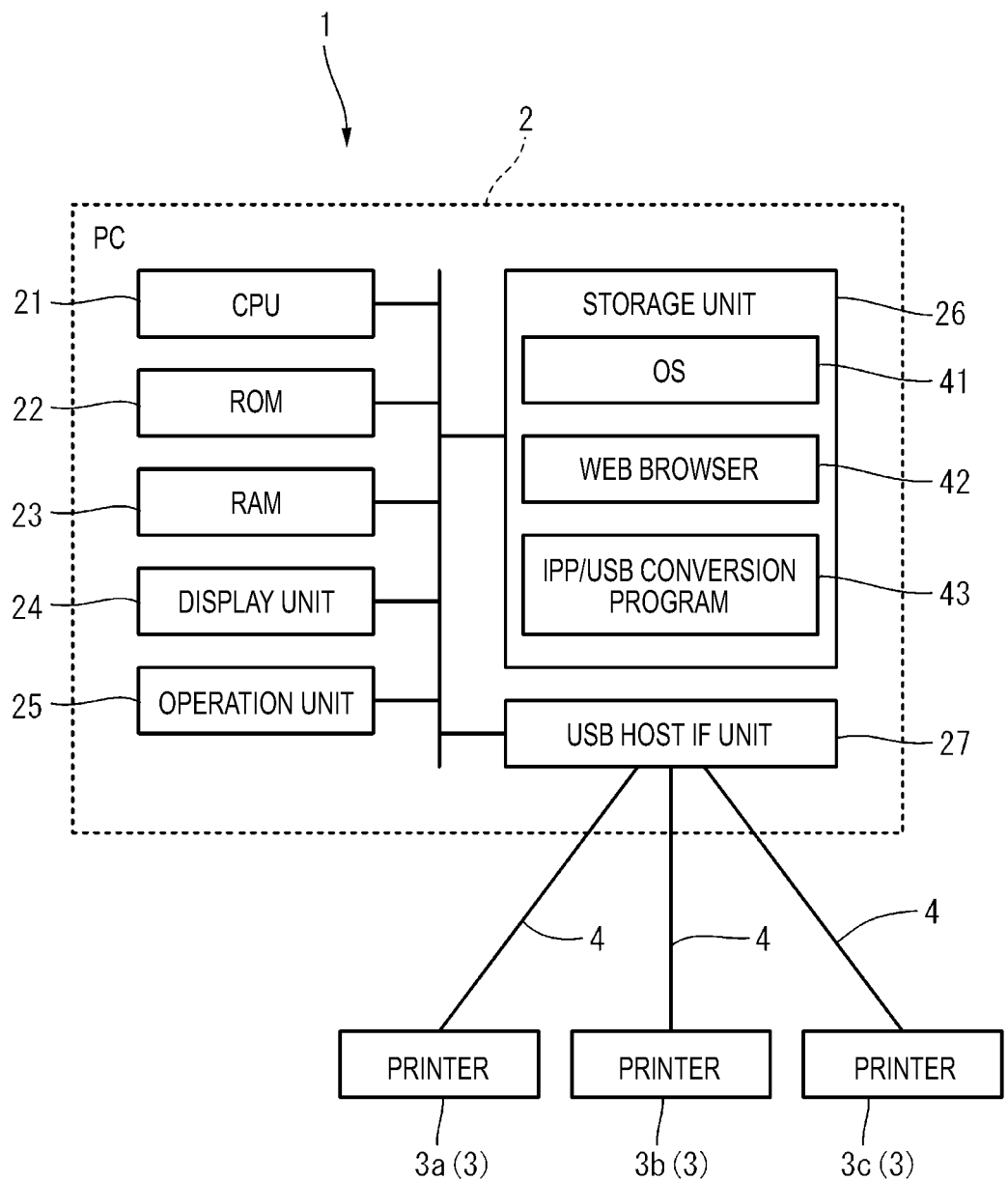
FIG. 1 is a block diagram illustrating an electrical configuration of a PC according to an exemplary embodiment.

First, an image processing system 1 will be described with reference to FIG. 1. The image processing system 1 is configured by a personal computer (referred to as a PC) 2 and a plurality of printers 3 (3a to 3c). The PC 2 and the printers 3a to 3c are connected to each other by USB (Universal Serial Bus) cables 4 (4a to 4c) and are able to perform communication.

Each of the printers 3a to 3c is configured as a USB printer class device. In the following description, each of the printers 3a to 3c will be referred to simply as a printer 3. Incidentally, the printers 3a to 3c may be the same model or may be different models.

The PC 2 is an example of an information processing apparatus and a communication relaying apparatus. The printers 3 are examples of an image processing apparatus. USB is an example of a communication interface.

The PC 2 may perform at least the following two kinds of communication (a) and (b) with the printer 3 through the USB cable 4:

(a) for setting the printer 3

(b) for transmitting print data to the printer 3

Such communication is performed according to the "IPP over USB" standard (Version 1.0 Draft 20 as of Nov. 19, 2012). IPP (Internet Printing Protocol) is a standard based on HTTP (HyperText Transfer Protocol) and for performing communication with the printers 3 through a Transmission Control Protocol/Internet Protocol (TCP/IP) network such as the Internet or a local area network (LAN).

"IPP over USB" is a standard for implementing communication according to the above-described IPP in an environment in which the PC and the printers are connected to each other through USB interface. In "IPP over USB", communication data of IPP is stored in USB packets which are transmitted and received. Incidentally, the present exemplary embodiment may not completely be in compliance with the "IPP over USB" standard, and may have the extended specifications thereof.

(1-1) Electrical Configuration of PC

The electrical configuration of the PC 2 will be described with reference to FIG. 1. The PC 2 includes a CPU 21, a ROM 22, a RAM 23, a display unit 24, an operation unit 25, a storage unit 26 and a USB host interface unit (referred to as "USB HOST IF UNIT" in FIG. 1) 27.

The CPU 21 controls each unit of the PC 2 by executing programs stored in the ROM 22 and the storage unit 26. The ROM 22 stores programs to be executed by the CPU 21, data, and so on. The RAM 23 is used as a main storage device which is used for the CPU 21 to perform a variety of processes. The CPU 21 is an example of a processing unit.

The display unit 24 is configured to include a display such as a liquid crystal display, a display driving circuit for driving the display, and so on.

The operation unit 25 is configured by a keyboard, a mouse, an interface to which the keyboard and the mouse are connected, and so on.

The storage unit 26 is a device using a non-volatile memory such as a hard disk drive and/or a flash memory to store a variety of programs and data. The storage unit 26 stores an operating system (referred to as an OS) 41, a web browser 42, and programs such as an IPP/USB conversion program 43. These programs are executed by the CPU 21.

The IPP/USB conversion program 43 is an example of a communication relaying program. The web browser 42 is an example of a client application and a specific application. The storage unit 26 is an example of a storage device.

The USB host interface unit 27 includes a USB host controller, jacks for receiving the USB cables 4, and so on. The USB host interface unit 27 is connected to the printers 3 through the USB cables 4, respectively, such that communication is possible. The USB host interface unit 27 is an example of a communication unit.

(1-2) Printer

Figure 2:
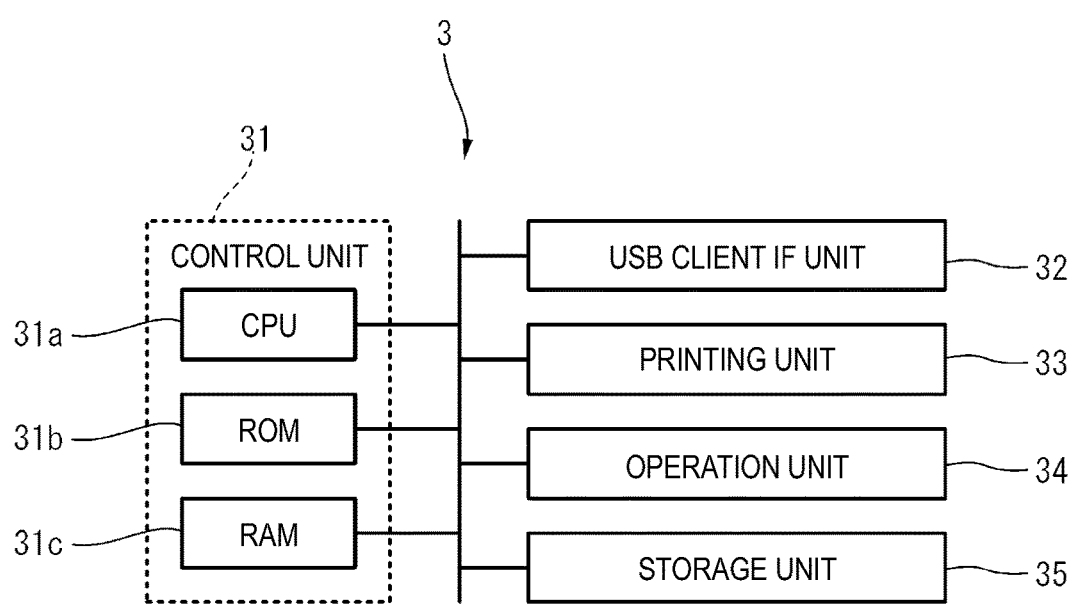
FIG. 2 is a block diagram illustrating an electrical configuration of a printer.

Subsequently, the electrical configuration of a printer 3 will be described with reference to FIG. 2. The printer 3 includes a control unit 31, a USB client interface unit (referred to as "USB CLIENT IF UNIT" in FIG. 2) 32, a printing unit 33, an operation unit 34, and a storage unit 35.

The control unit 31 includes a CPU 31a, a ROM 31a, a RAM 31c, and so on. The CPU 31a controls each unit of the printer 3 by executing control programs stored in the ROM 31a and the storage unit 35. The ROM 31b stores programs to be executed by the CPU 31a, a variety of data, and so on. The RAM 31c is used as a main storage device which is used for the CPU 31a to perform a variety of processes.

The printing unit 33 is configured to print an image on a sheet in accordance with an electrophotographic system, an inkjet system, or the like. The printing unit 33 includes a first tray and a second tray configured to store sheets.

The operation unit 34 includes a display such as a liquid crystal display, a variety of operation buttons, and so on.

The storage unit 35 is a device using a non-volatile memory such as a hard disk drive and/or a flash memory to store a variety of data.

The USB client interface unit 32 includes a jack for receiving a USB cable 4, and so on. The USB client interface unit 32 is connected to the PC 2 through the USB cable 4 such that communication is possible.

Further, according to the USB specifications, in the USB client interface unit 32, a variety of descriptors such as a device descriptor, a string descriptor, a vendor class descriptor, and an interface descriptor are stored. The device descriptor is information relative to the printer 3.

For example, in the device descriptor, the vendor ID, product ID, and the like of the printer 3 are described. In the interface descriptor, information for configuring an interface (which will be described later) is described. The string descriptor is a descriptor for returning character string information corresponding to an index. By designating the index, the PC 2 is able to obtain a vendor name, a model name, and a serial number from the printer 3. Since a unique serial number is assigned to each of devices of the same model, it is possible to specify the device by combining the vendor name, the model name, and the serial number.

(2) Setting Screen of Printer

Subsequently, a setting screen 50 of the printer 3 will be described with reference to FIG. 3. The setting screen 50 is displayed by the web browser 42. The screen data of the setting screen 50 is described in HTML (HyperText Markup Language) or XML (Extensible Markup Language). Hereinafter, the embodiment is described under assuming that the screen data is described in HTML.

As will be described in detail, a web server function 62 (see FIG. 4) of the printer 3 is configured to execute a setting screen CGI (Common Gateway Interface) to generate the screen data. The web browser 42 is configured to obtain the screen data from the printer 3 according to "IPP over USB" and to display the setting screen 50. It is assumed that the file name of the screen data of the setting screen 50 is "main.html".

Figure 3:
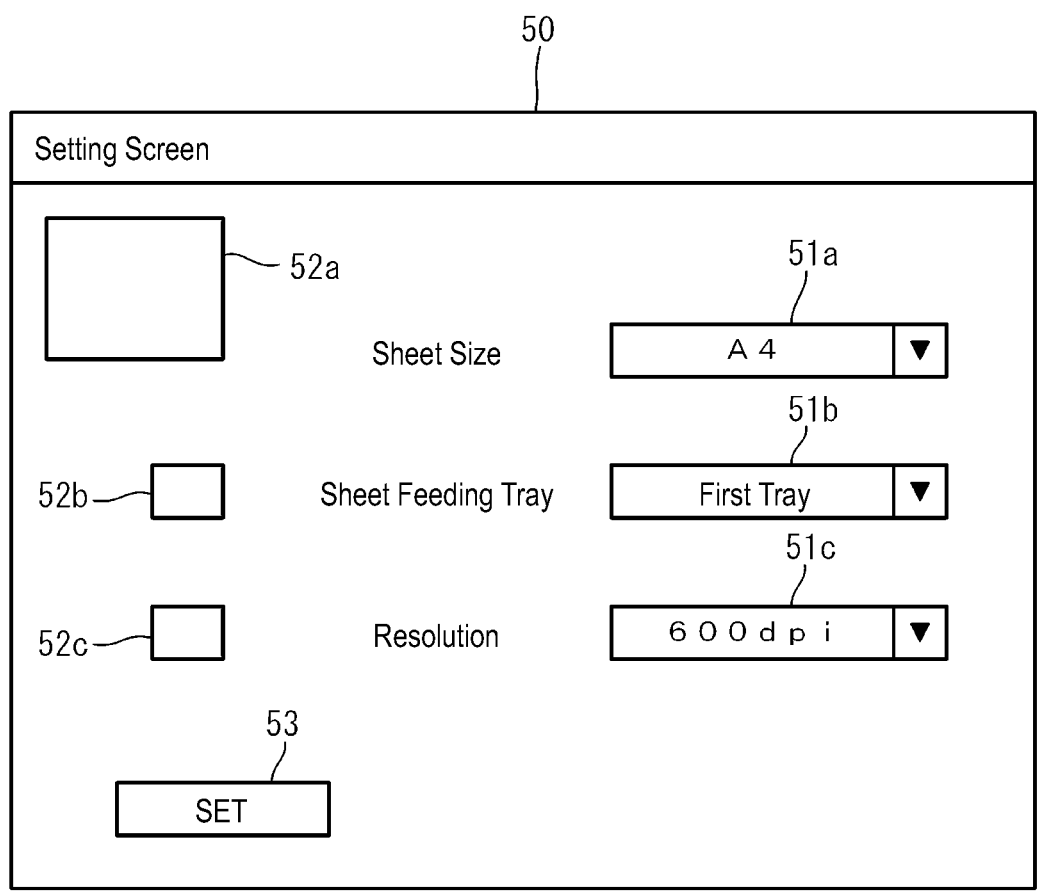
FIG. 3 is a schematic diagram illustrating a setting screen of the printer.

On the setting screen 50 shown in FIG. 3, it is available to set an item "SHEET SIZE" 51a, an item "SHEET FEEDING TRAY" 51b, and an item "RESOLUTION" 51c.

Further, on the setting screen 50, component images such as an image 52a, an image 52b, and an image 52c, and a set button 53. Here, the images 52a, 52b and 52c are referred to as GIF1, GIF2, and GIF3, respectively.

Incidentally, the setting screen 50 shown in FIG. 3 is an example, and the setting screen 50 may be different depending on the model of the printer 3.

(3) Program Configuration of PC and Functions of Printer

Figure 4:
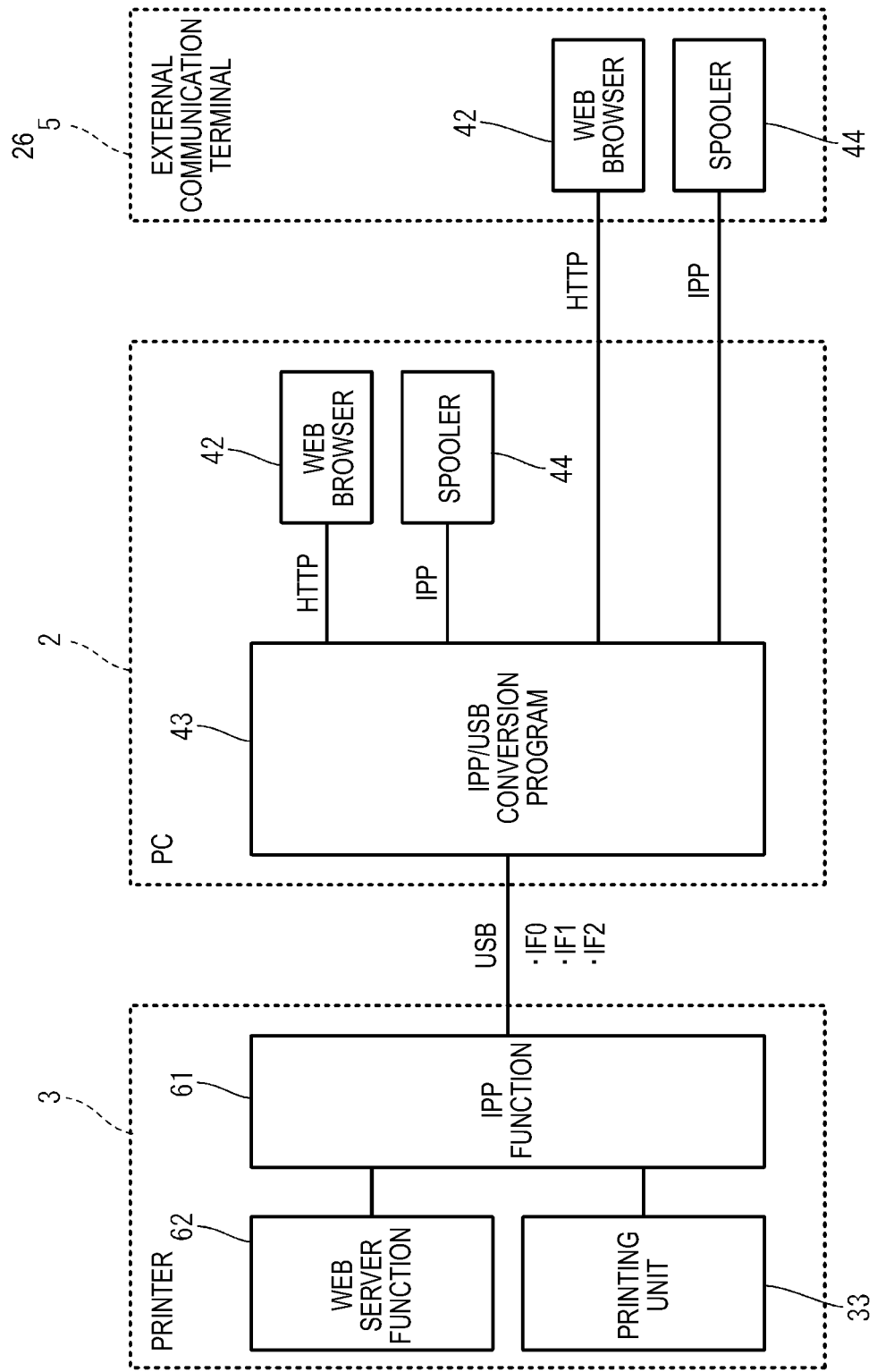
FIG. 4 is a schematic diagram illustrating a program configuration of the PC and functions of the printer.

Subsequently, the program configuration of the PC 2 for performing communication according to "IPP over USB", and the functions of a printer 3 will be described with reference to FIG. 4.

(3-1) Program Configuration of PC

First, the program configuration of the PC 2 will be described. The PC 2 is configured to execute the IPP/USB conversion program 43, the web browser 42 and a spooler 44.

The IPP/USB conversion program 43 is for relaying the following communications (a) and (b):

(a) communication between the web browser 42 and an IPP function 61 for setting the printer 3

(b) communication between the spooler 44 and the IPP function 61 for transmitting print data to the printer 3

The IPP/USB conversion program 43 is resident as a server program for "http://localhost". This server program is configured to monitor port "80", port "631", and a plurality of reserved ports, which are reserved in advance. Incidentally, the term "reserved port" means a port having a port number other than particular port numbers ("Well-Known Ports") being used in a main protocol of TCP/IP. The reserved port is reserved in advance such that any other program may not use the reserved port. The port numbers of the plurality of reserved ports may be inconsecutive. The port numbers of the reserved ports are stored in the storage unit 26. "localhost" is the IP address of the PC 2, and may be, for example, "127.0.0.1".

The IPP/USB conversion program 43 is configured to perform communication with the web browser 42 according to HTTP and to perform communication with the spooler 44 according to IPP.

Further, the IPP/USB conversion program 43 performs communication with the IPP function 61 through USB interface. The IPP/USB conversion program 43 will be described later in detail.

The web browser 42 is used as a user interface which allows a user to perform setting of the printer 3. As the web browser 42, a known web browser can be used.

In an environment where the PC 2 and the printer 3 are connected to each other through USB interface, the web browser 42 transmits an HTTP request for requesting transmission of the screen data of the setting screen 50, an HTTP request for requesting transmission of a component image to be displayed on the setting screen 50, and the like, to the above-described host "localhost". Each of these HTTP requests is an example of a processing request. In the following description, an HTTP request is referred to simply as a processing request.

Incidentally, the processing request is not limited thereto. For example, a request for setting a set value, set on the setting screen 50 by a user, in the printer 3, such as a PUT command or a POST command, may be transmitted as a processing request.

In response to that the IPP/USB conversion program 43 receives a processing request from the web browser 42, the IPP/USB conversion program 43 transmits that processing request to the IPP function 61 through USB interface.

The spooler 44 is a program for spooling print data. The spooler 44 is provided as a part of the OS 41. In the environment where the PC 2 and the printer 3 are connected to each other through USB interface, the spooler 44 performs communication with the IPP/USB conversion program 43 according to IPP to transmit print data to the IPP/USB conversion program 43.

Upon receiving the print data from the spooler 44, the IPP/USB conversion program 43 transmits the print data to the IPP function 61 of the printer 3 through USB.

Incidentally, the web browser 42 and the spooler 44 may be executed in the PC 2, or may be executed in an external communication terminal 5 connected to the PC 2.

(3-2) Functions of Printer

Subsequently, the functions of the printer 3 will be described. The printer 3 has the IPP function 61, the web server function 62 and the printing unit 33.

The control unit 31 of the printer 3 is configured to execute a control program to implement the IPP function 61. The IPP function 61 is configured to perform communication with the IPP/USB conversion program 43 through USB. Further, the IPP function 61 is configured to perform communication with the web server function 62 according to HTTP, and to perform communication with the printing unit 33 according to a predetermined protocol.

Also, the web server function 62 is implemented by the control unit 31 of the printer 3 executing the control program. The web server function 62 is configured to perform a process of executing the setting screen CGI so as to generate the image data of the setting screen 50 upon transmission of the image data is requested, a process of executing a printer setting CGI so as to set a set value, set on the setting screen 50, in the printer 3 upon the set value is received, and so on.

(4) Interface in USB

Subsequently, an interface in USB will be described. In USB, one or more logical communication lines referred to as "Interfaces" are configured for one physical USB cable 4.

In USB, a special endpoint referred to as "Endpoint 0" for performing protocol transmission is necessarily configured. At Endpoint 0 bidirectional communication is available. Each "Interface" is configured according to the interface descriptor obtained from the printer 3 through Endpoint 0. Each "Interface" has generally one or more endpoints.

In the printer 3 of the present exemplary embodiment, it is assumed that "Interface 0" using the endpoint 0, "Interface 1" and "Interface 2" are configured. Further, each of "Interface 1" and "Interface 2" has an endpoint for reading and an endpoint for writing, respectively, and use those endpoints, thereby implementing bidirectional communication.

Further, it is assumed that "Interface 1" is used to perform the above-described communication (a) for setting the printer 3, and "Interface 2" is used to perform the communication (b) for transmitting print data to the printer 3.

Alternatively, "Interface 1" may be used to perform both of the communications (a) and (b), without configuring "Interface 2".

(5) Problem in Case where Multiple Printers are Connected by USB

Subsequently, a potential problem in a case where a plurality of printers 3 is connected to one PC 2 through USB interface will be described. Here, communication (a) for setting a printer 3 will be described as an example.

In the environment where the printers 3 and the PC 2 are connected to each other through USB interface, the user may input the following URL to the web browser 42, thereby requesting the IPP/USB conversion program 43 to transmit the screen data of the setting screen 50.

http://localhost/main.html

Since any port number is not set in the above URL, upon the above URL is input, the web browser 42 requests a logical communication port identified by the port number "80" of "localhost" to establish a session. The port number "80" is generally a default port number of a web server.

Each port number is an example of a network port and a communication path. The port number "80" is an example of a specific network port.

As described above, the IPP/USB conversion program 43 monitors a communication port having the port number "80", and is configured to establish a session between the IPP/USB conversion program 43 and the web browser 42 through the corresponding communication port upon session establishment is requested. Upon the session is established, the web browser 42 transmits the following processing request A to the IPP/USB conversion program 43 through the session.

GET /main.html HTTP/1.0 . . . PROCESSING REQUEST A

In order to access to a communication partner apparatus through a network, the web browser 42 generally needs to designate an IP address to select the communication partner apparatus. However, in the configuration of the present exemplary embodiment, the IP address is just "localhost". Therefore, designating the IP address "localhost" does not specify any one of the printers 3*a* to 3*c*.

Thus, in an environment where the printers 3*a* to 3*c* are connected to the PC 2 through USB interface, even if the IPP/USB conversion program 43 receives the processing request A, it is not possible to specify one printer 3 as the transmission destination of the processing request A.

For this reason, the IPP/USB conversion program 43 is configured to assign a unique port number to unique apparatus information for identifying each printer 3 and use the assigned port numbers to specify one printer 3 as the transmission destination of a processing request. This will be described later in detail.

Figure 5:
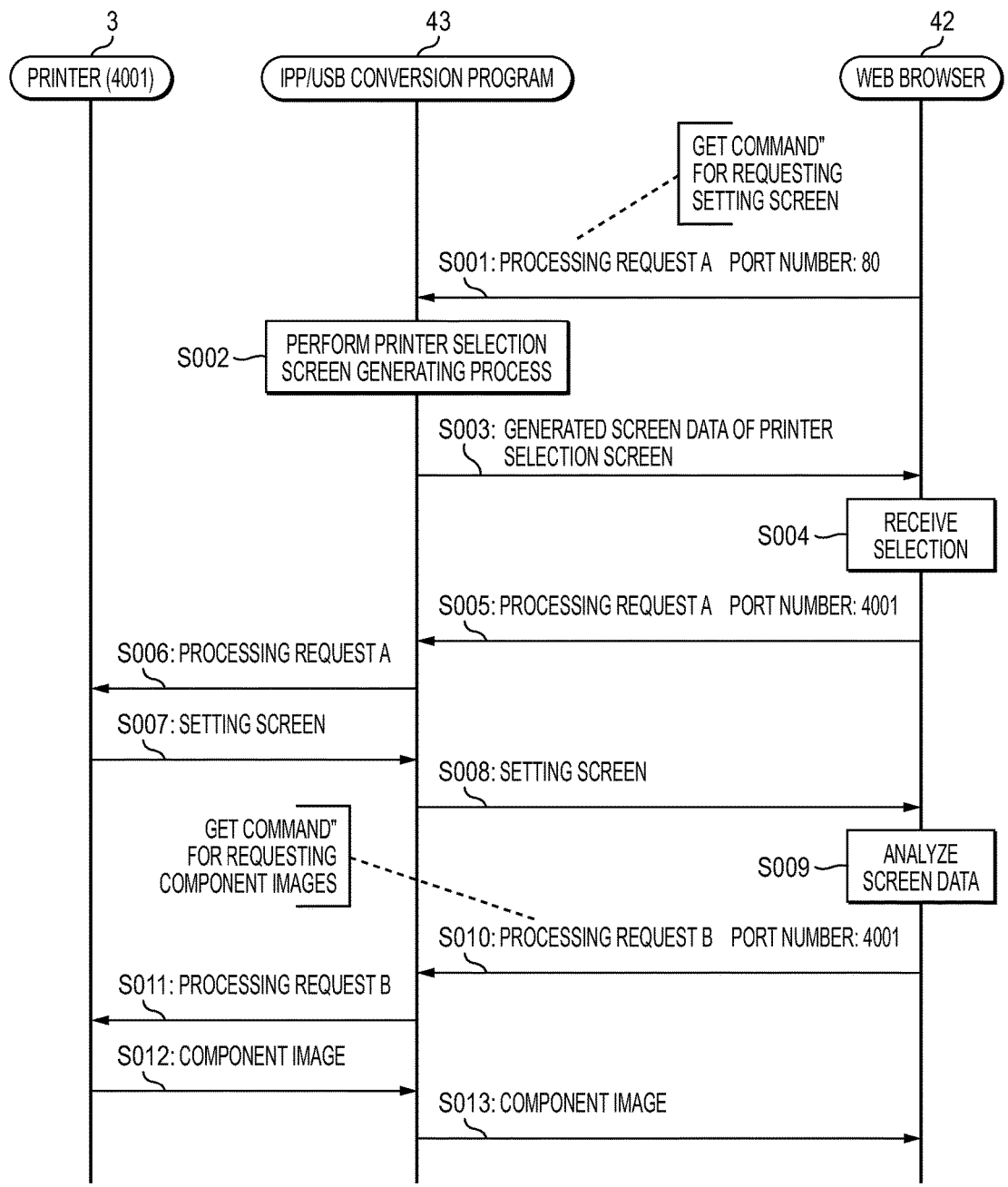
FIG. 5 is a sequence chart illustrating the overall flow of a communication process.

(6) Overall Flow of Communication Process According to IPP/USB Conversion Program First, the overall flow of a communication process will be described with reference to FIG. 5. Here, the above-described communication (a) for setting a printer 3 will be described as an example. Further, here, as an object to be set, the printer 3*a* will be described as an example.

Upon the user inputs the above URL to the web browser 42, in STEP S001, the web browser 42 requests the communication port of the port number "80" of "localhost" to establish a session, and transmits the above-described processing request A through the established session.

However, since the processing request A does not include information indicating a printer 3 as described above, the IPP/USB conversion program 43 is unable to specify one printer 3 as the transmission destination of the processing request A. In a case where it is not possible to specify one printer 3 as the transmission destination of the processing request A, in STEP S002, the IPP/USB conversion program 43 performs a printer selection screen generating process, thereby generating screen data of a printer selection screen 55 (which will be described later). The printer selection screen generating process will be described later in detail, and here, the screen structure of the printer selection screen 55 and the screen data of the printer selection screen 55 will be described in brief. The printer selection screen 55 is an example of a screen.

Figure 6:
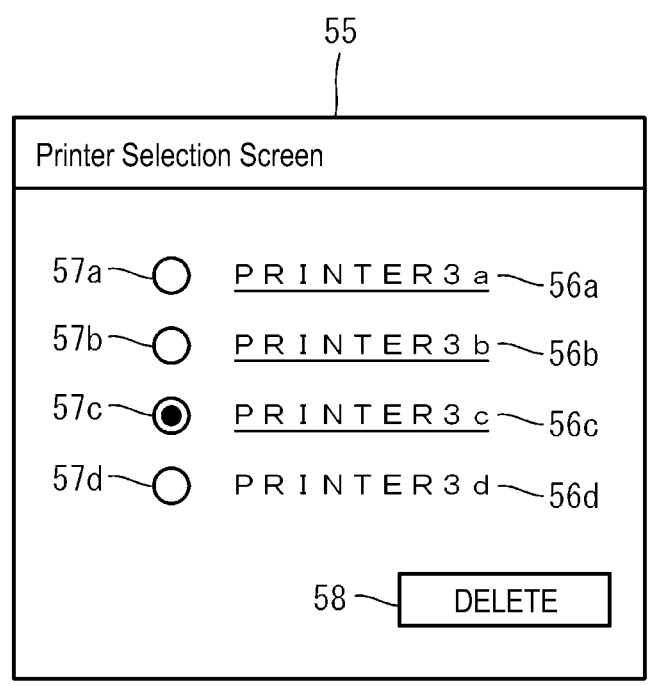
FIG. 6 is a schematic diagram illustrating a printer selection screen.

First, the screen structure of the printer selection screen 55 will be described with reference to FIG. 6. On the printer selection screen 55, the model names 56*a* to 56*c* of the printers 3*a* to 3*c* connected to the PC 2 through USB interface are displayed as a list. In FIG. 6, lines under the model names 56*a* to 56*c* represent links.

Further, as will be described later in detail, on the printer selection screen 55, a model name 56*d* of a printer 3*d* which had been connected to the PC 2 through USB interface in the past but is disconnected from the PC 2 at present is also displayed. However, the model name 56*d* of the printer 3*d* is just displayed, and for the model name 56*d*, any link has not been set.

Further, in front of each model name, a radio button 57 (57*a* to 57*d*) for selecting the corresponding model name is displayed. Even with respect to the model name 56*d* of the printer 3*d*, a radio button 57 is displayed. Further, a delete button 58 is displayed on the printer selection screen 55. The radio buttons 57 and the delete button 58 will be described later.

Subsequently, the screen data for displaying the printer selection screen 55 will be described with reference to FIG. 7. For each model name, a URL requesting the IPP/USB conversion program 43 to transmit the image data of the setting screen 50 is set as a link.

Specifically, when generating the image data of the printer selection screen 55, the IPP/USB conversion program 43 obtains a model name, a vendor ID, a product ID, and a serial number from the USB client interface unit 32 of each of the printers 3*a* to 3*c*. Here, this information set is referred to as the unique apparatus information of the corresponding printer 3. Next, the IPP/USB conversion program 43 assigns a unique port number to the unique apparatus information of each printer. Then, the IPP/USB conversion program 43 sets a unique port number assigned to the unique apparatus information of each printer, in a URL as shown in FIG. 7. For example, in FIG. 7, "4001" is a unique port number assigned to the unique apparatus information of the printer 3*a*. Similarly, "4002" is a unique port number assigned to the unique apparatus information of the printer 3*b*, and "4003" is a unique port number assigned to the unique apparatus information of the printer 3*c*.

Here, each model name is an example of the identification information of an image processing apparatus. The screen data of the printer selection screen 55 is an example of selection screen information which is for displaying a screen for receiving selection of the identification information of an image processing apparatus, and is configured such that upon identification information is selected on the corresponding screen, a processing request for which a communication path of an image processing apparatus identified by the selected identification information has been designated is transmitted by a client application.

Incidentally, in a case where the plurality of printers 3 connected to the PC 2 are the same model, it is not possible to identify each printer only by the model names. In this case, as identification information, for example, information "Model Name_Serial Number" obtained by adding a serial number to a corresponding model name may be displayed, or information "Model Name_USB Port Number" obtained by adding a USB port number to a corresponding model name may be displayed. Alternatively, like "Model Name (1)" and "Model Name (2)", it is possible to identify the printers by numbers. The identification information can be appropriately determined if it is possible to identify each printer 3.

The identification information is not limited to the model names. For example, the identification information may be images showing the printers 3. Alternatively, the identification information of each printer 3 may be a combination of an image and a printer name given to the corresponding printer 3.

Upon assigning a unique port number to the unique apparatus information of the printer 3, the IPP/USB conversion program 43 stores the unique apparatus information and the port numbers in association with each other in the storage unit 26. The reason why the unique apparatus information and the port numbers are stored in association with each other is for specifying a printer 3 corresponding to the port number of a communication port in a case where the IPP/USB conversion program 43 receives the processing request A through the corresponding communication port.

Referring to FIG. 6 again, the delete button 58 is a button for allowing the user to issue an instruction to delete unique apparatus information and a port number associated with the corresponding unique apparatus information from the storage unit 26.

For example, even if the printer 3 is disconnected with the PC 2, the unique apparatus information of the printer 3 remains in association with a port number in the storage unit 26.

For this reason, in a case where the unique apparatus information of a printer 3 disconnected from the PC 2 remains in association with a port number in the storage unit 26, the IPP/USB conversion program 43 displays the model name of the corresponding printer 3 (for example, "PRINTER3*d*") on the printer selection screen 55.

Upon the user selects the radio button 57 for a disconnected printer 3 on the printer selection screen 55 and clicks the delete button 58, a port number delete request for deleting the port number and unique apparatus information of the selected printer 3 from the storage unit 26 is transmitted to the IPP/USB conversion program 43. In this way, it is possible to prevent the unique apparatus information and port number of a disconnected printer 3 from remaining in the storage unit 26. The port number delete request is an example of a communication path delete request.

Here, it is assumed that the port number delete request is transmitted as a POST command. It is assumed that the POST command is transmitted to the IPP/USB conversion program 43 through a communication port identified by the default port number "80".

Referring to FIG. 5 again, in STEP S003, the IPP/USB conversion program 43 transmits the generated screen data of the printer selection screen 55 to the web browser 42.

Upon the web browser 42 receives a model name, clicked on the printer selection screen 55 by the user, in STEP S004, the web browser 42 requests a communication port, identified by a port number defined in a link set for the corresponding model name, to establish a session. For example, it is assumed that the user has clicked a model name "PRINTER3*a*" on the printer selection screen 55. In this case, the web browser 42 requests a communication port identified by the port number "4001" of "localhost" to establish a session.

Upon session establishment is requested, the IPP/USB conversion program 43 establishes a session between the IPP/USB conversion program 43 and the web browser 42 through the corresponding port. Upon the session is established, in STEP S005, the web browser 42 transmits the processing request A to the IPP/USB conversion program 43 through the corresponding session.

Upon receiving the processing request A, the IPP/USB conversion program 43 reads unique apparatus information associated with the port number of the communication port having received the processing request A, from the storage unit 26. Then, in STEP S006, the IPP/USB conversion program 43 transmits the processing request A to a printer 3 (here, the printer 3*a*) identified by the read unique apparatus information, through USB.

Upon receiving the processing request A, in STEP S007, the printer 3*a* transmits the screen data of the setting screen 50 to the IPP/USB conversion program 43.

Upon receiving the screen data from the printer 3*a*, in STEP S008, the IPP/USB conversion program 43 transmits the received screen data to the web browser 42.

Then, the web browser 42 analyzes the received screen data of the setting screen 50 in STEP S009 and transmits a processing request B for requesting transmission of a component image to the IPP/USB conversion program 43 in STEP 5010. For example, in a case of requesting transmission of GIF1, the following processing request B is transmitted to the IPP/USB conversion program 43.

GET /GIF1 HTTP/1.0 . . . PROCESSING REQUEST B

Here, it is assumed that in the screen data of the setting screen 50, a path to the component image has been described by a relative path. In the case where the path to the component has been described by the relative path, the web browser 42 transmits the processing request B to the IPP/USB conversion program 43 through the communication port having received the above-described processing request A. This is the general specification of the web browser 42.

Upon the IPP/USB conversion program 43 receives the processing request B from the web browser 42, in STEP S011, the IPP/USB conversion program 43 transmits the processing request B to the printer (that is, the printer 3*a*) identified by unique apparatus information associated with the communication port having received the processing request B. In this way, the processing request B is transmitted to the printer 3*a* to which the processing request A has been transmitted.

Upon the printer 3*a* receives the processing request B, in STEP S012, the printer 3*a* transmits the component image requested by the processing request B, to the IPP/USB conversion program 43.

Upon receiving the component image from the printer 3*a*, in STEP S013, the IPP/USB conversion program 43 transmits the received component image to the web browser 42.

This series of processes is repeated with respect to the GIF1 to GIF3, whereby the GIF1 to the GIF3 are read to the web browser 42 and are displayed on the setting screen 50.

Operation on the setting screen 50 is converted into a processing request such as a GET command, a PUT command, a POST command, or the like of HTTP, and is similarly transmitted to the printer 3*a* through the IPP/USB conversion program 43. In this way, it is possible to perform setting of the printer 3*a* through USB in the same procedure as that for performing setting of a printer through a TCP/IP network according to the related art.

(7) Details of Communication Relaying Process by IPP/USB Conversion Program

Subsequently, a communication relaying process of the IPP/USB conversion program 43 will be described in detail.

(7-1) Process of Receiving Processing Request from Web Browser

Figure 8:
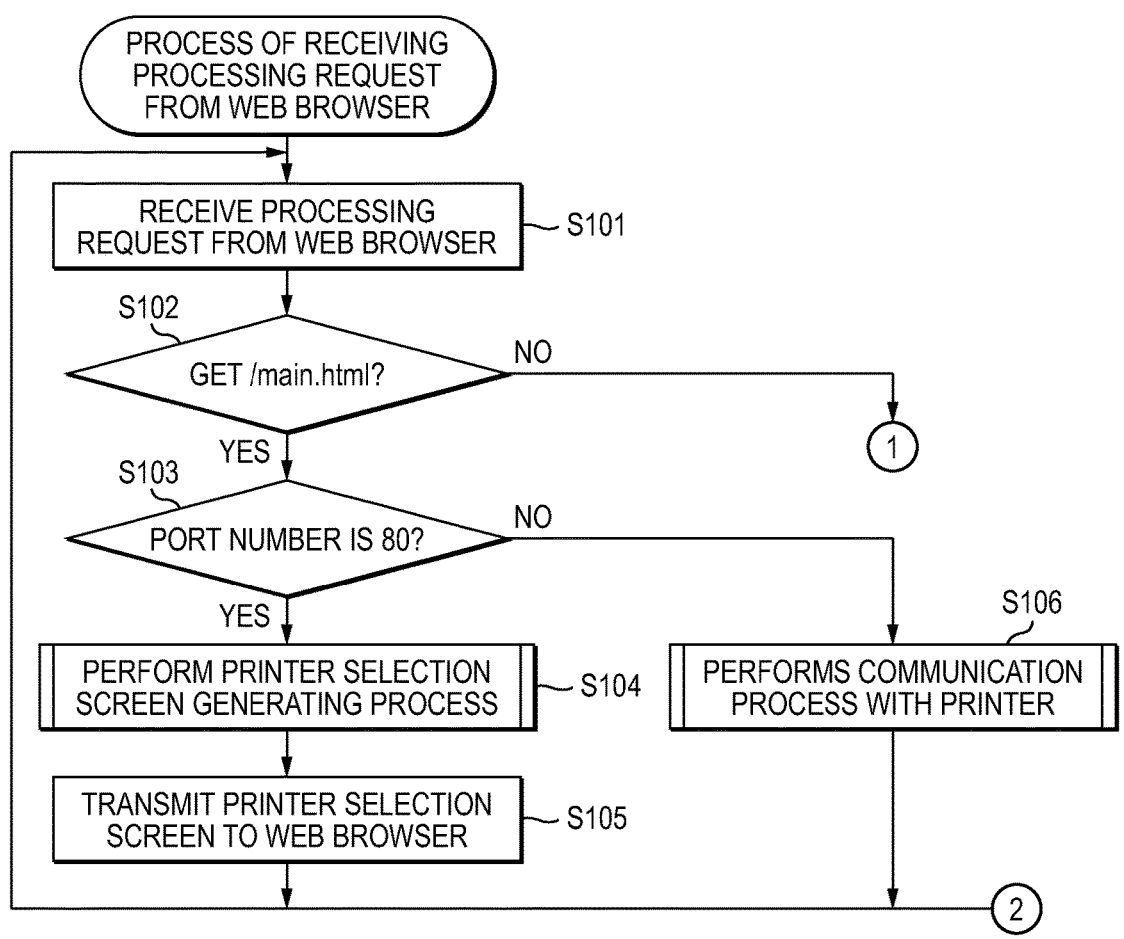
FIG. 8 is a flow chart illustrating a part of a process of receiving a processing request from a web browser.
Figure 9:
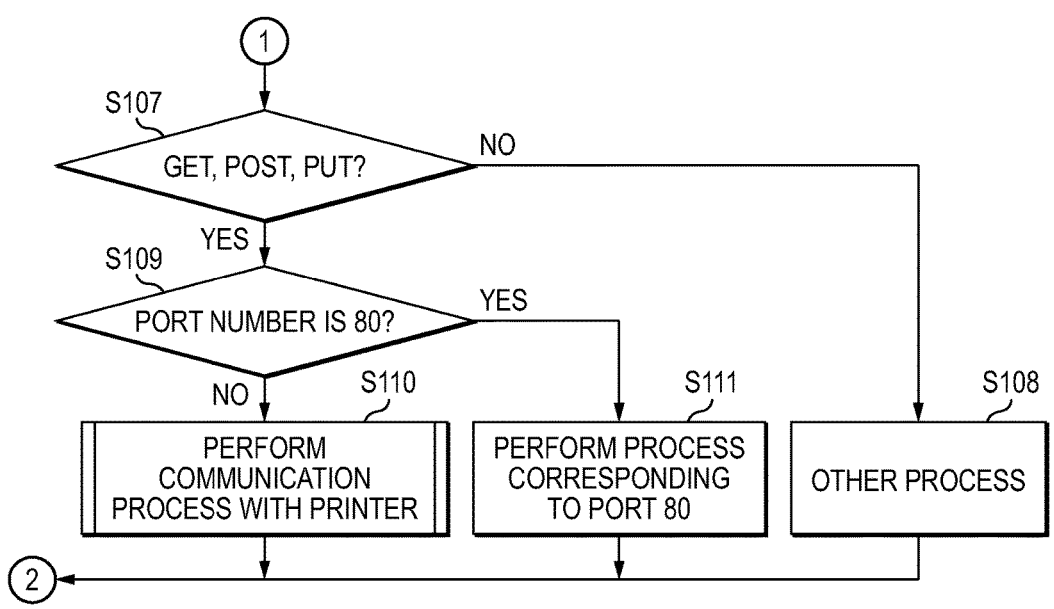
FIG. 9 is a flow chart illustrating the process of receiving the processing request from the web browser continued from FIG. 8.

First, a process of the IPP/USB conversion program 43 receiving a processing request from the web browser 42 will be described with reference to FIGS. 8 and 9. As described above, the IPP/USB conversion program 43 is executed as a resident program, and the present process starts upon the PC 2 is powered on.

In STEP S101, the IPP/USB conversion program 43 waits for a processing request to be received from the web browser 42. Upon receiving the processing request, the IPP/USB conversion program 43 proceeds to STEP S102. STEP S101 is an example of a request receiving process.

Here, it is assumed that the user who does not know a port number assigned to a target printer 3 sets a URL in which a port number has not been set, on the web browser 42, as described above, and requests transmission of the screen data of the setting screen 50. In this case, the IPP/USB conversion program 43 receives that processing request (the processing request A) through the communication port identified by the default port number "80" as described above.

In contrast, in a case where the processing request is received in STEP S101 after STEP S105 (which will be described later) is performed, the printer selection screen 55 has been transmitted to the web browser 42 in STEP S105. Upon the user clicks the link of the target printer 3 on the printer selection screen 55, a URL in which a unique port number has been designated in the unique apparatus information of the selected printer 3 is input to the web browser 42. Thereafter, the web browser 42 transmits the processing request (the processing request A) through a communication port identified by the particular port number. The IPP/USB conversion program 43 receives that processing request through the corresponding communication port.

Incidentally, the processing request which is received in STEP S101 is not limited to the processing request A, and a processing request (a processing request B) for requesting transmission of a component image, or a port number delete request may also be transmitted. Further, any other processing requests may be received.

In STEP S102, the IPP/USB conversion program 43 determines whether the processing request received in STEP S101 is a processing request (the processing request A) for requesting transmission of the setting screen 50. In a case where the received processing request is the processing request A, the IPP/USB conversion program 43 proceeds to STEP S103; whereas in a case where the received processing request is any other processing request, the IPP/USB conversion program 43 proceeds to STEP S107.

In STEP S103, the IPP/USB conversion program 43 determines whether the port number of a communication port having received the processing request in STEP S103 is the default port number "80".

For example, in a case where the user sets a URL in which any port number has not been set, on the web browser 42, and requests transmission of the screen data of the setting screen 50, in STEP S102, it is determined that the received processing request is the processing request A for requesting transmission of the setting screen 50, and in STEP S103, it is determined that the port number of the communication port having received the processing request is the default port number "80". In contrast, in a case where the user clicks a model name on the printer selection screen 55, in STEP S102, it is determined that the received processing request is the processing request A for requesting transmission of the setting screen 50. However, in this case, since the processing request is received through a communication port having a unique port number associated with the unique apparatus information of a printer 3, in STEP S103, it is determined that the unique port number of the communication port having received the processing request is not the default port number "80".

In the case where the unique port number is the default port number "80", the IPP/USB conversion program 43 proceeds to STEP S104; whereas in the case where the unique port number is not the default port number "80", the IPP/USB conversion program 43 proceeds to STEP S106.

In STEP S104, the IPP/USB conversion program 43 performs the above-described printer selection screen generating process of generating the printer selection screen 55. The printer selection screen generating process will be described later. The printer selection screen generating process is an example of a screen information generating process.

In STEP S105, the IPP/USB conversion program 43 transmits the screen data of the printer selection screen 55 generated in STEP S104, to the web browser 42. STEP S105 is an example of a screen information transmitting process. Further, the screen data of the printer selection screen 55 is an example of the selection screen information.

In STEP S106, the IPP/USB conversion program 43 performs a communication process with the corresponding printer 3. The communication process with the corresponding printer 3 will be described later.

In STEP S107, the IPP/USB conversion program 43 determines whether the processing request received in STEP S101 is any one of a GET command, a POST command and a PUT command. In a case where the received processing request is not any one of a GET command, a POST command and a PUT command, the IPP/USB conversion program 43 proceeds to STEP S108; whereas in a case where the received processing request is any one of a GET command, a POST command and a PUT command, the IPP/USB conversion program 43 proceeds to STEP S109.

In STEP S108, the IPP/USB conversion program 43 performs a process corresponding to the received processing request.

In STEP S109, the IPP/USB conversion program 43 determines whether the unique port number of the communication port having received the processing request in STEP S101 is the default port number "80".

For example, in a case of a processing request B for requesting transmission of a component image, the determination result of STEP S102 is negative, and the determination result of STEP S107 is positive, and the determination result of STEP S109 is negative. On the other hand, for example, in a case of a port number delete request, since the port number delete request is transmitted as a POST command through the communication process identified by the default port number "80", the determination result of STEP S102 is negative, and the determination result of STEP S107 is positive, and the determination result of STEP S109 is positive.

In a case where the unique port number is not the default port number "80", that is, in a case where the unique port number is a port number assigned to the unique apparatus information of a printer 3, the IPP/USB conversion program 43 proceeds to STEP S110; whereas in a case where the unique port number is the default port number "80", the IPP/USB conversion program 43 proceeds to STEP S111.

In STEP S110, the IPP/USB conversion program 43 performs a communication process with the corresponding printer 3. The communication process of a printer 3 will be described later.

In STEP S111, the IPP/USB conversion program 43 performs a process corresponding to port "80". The process corresponding to port "80" is, for example, a port number delete process. For example, in a case where the processing request is the port number delete request, the IPP/USB conversion program 43 deletes a port number set in the POST command, and unique apparatus information associated with the unique port number from the storage unit 26. Incidentally, the process corresponding to port "80" is not limited to the port number delete process. STEP S111 is an example of a deleting process.

When any one of STEPS S108, S110 and S111 finishes, the IPP/USB conversion program 43 returns to STEP S101.

(7-2) Printer Selection Screen Generating Process

Figure 10:
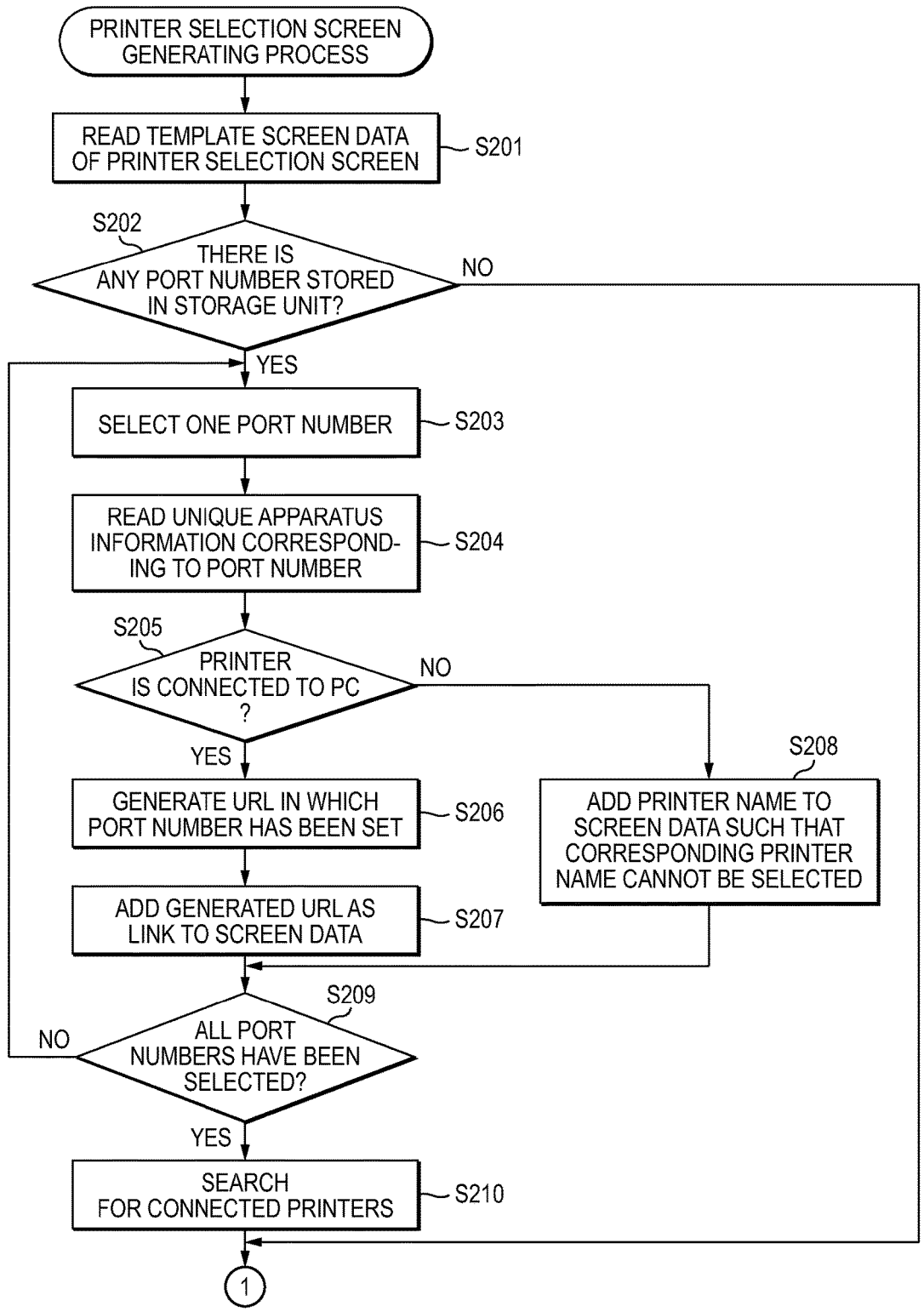
FIG. 10 is a flow chart illustrating a part of a printer selection screen generating process.
Figure 11:
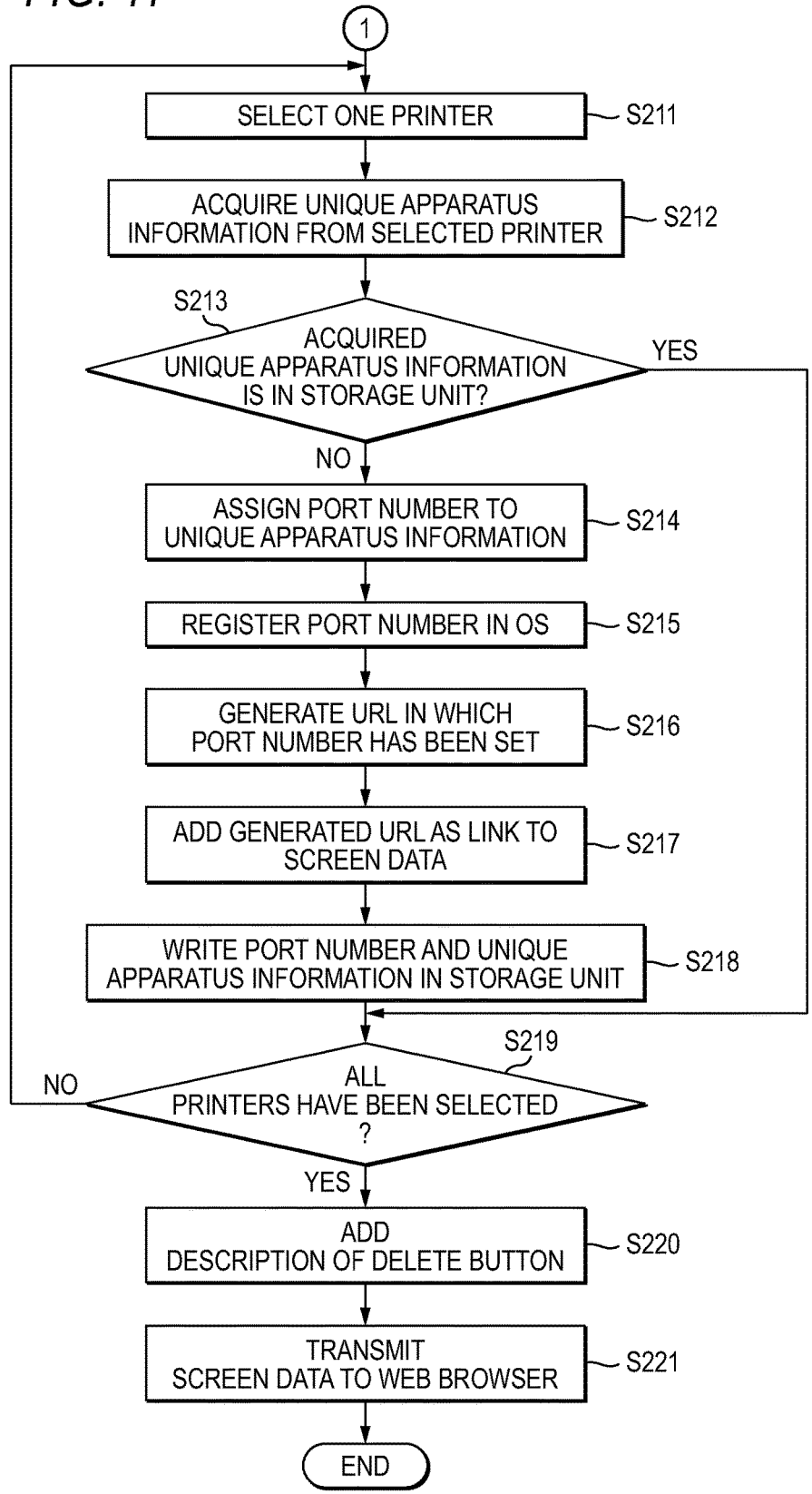
FIG. 11 is a flow chart illustrating the printer selection screen generating process continued from FIG. 10.

Subsequently, the printer selection screen generating process which is performed in STEP S104 will be described with reference to FIGS. 10 and 11.

In STEP S201, the IPP/USB conversion program 43 reads template screen data of the screen data for displaying the printer selection screen 55 from the storage unit 26. In this template screen data, a model name and a link have not been described.

In STEP S202, the IPP/USB conversion program 43 determines whether there is at least one port number stored in the storage unit 26. In a case where there is at least one port number stored in storage unit 26, the IPP/USB conversion program 43 proceeds to STEP S203; whereas in a case where there is no port number stored in the storage unit 26, the IPP/USB conversion program 43 proceeds to STEP S210.

In STEP S203, the IPP/USB conversion program 43 selects one port number stored in the storage unit 26.

In STEP S204, the IPP/USB conversion program 43 reads unique apparatus information associated with the port number selected in STEP S203, from the storage unit 26. In the storage unit 26, there is information of printers which had been connected to the PC 2 in the past and has been registered in STEP S218 (which will be described later).

In STEP S205, the IPP/USB conversion program 43 determines whether a printer 3 identified by the unique apparatus information read in STEP S204 is connected to the PC 2. In a case where the corresponding printer 3 is connected to the PC 2, the IPP/USB conversion program 43 proceeds to STEP S206; whereas in a case where the corresponding printer 3 is disconnected from the PC 2, the IPP/USB conversion program 43 proceeds to STEP S208. STEP S205 is an example of a connection determining process.

In STEP S206, the IPP/USB conversion program 43 generates a URL requesting transmission of the screen data of the setting screen 50 and sets the port number selected in STEP S203, in that URL. For example, in a case of the printer 3*a*, the URL is as follows.

http://localhost/main.html:4001

In STEP S207, the IPP/USB conversion program 43 adds the URL generated in STEP S206, as a link to the template screen data read in STEP S201. For example, in a case of the printer 3*a*, the following link is added.

<a href="http://localhost/main.html:4001">PRINTER3*a*</a>

On the other hand, in STEP S208, the IPP/USB conversion program 43 adds a description for displaying a model name associated with the port number selected in STEP S203, to the screen data. However, as described above, any link is not set for that model name. Therefore, the model name (for example, "PRINTER3*d*") of a printer 3 which had been connected to the PC 2 through USB interface in the past but is disconnected from the PC 2 at present is displayed on the printer selection screen 55 such that the model name cannot be selected.

In STEP S209, the IPP/USB conversion program 43 determines whether all of the stored port numbers have been selected. In a case where all port numbers have been selected, the IPP/USB conversion program 43 proceeds to STEP S210; whereas in a case where there is any unselected port number, the IPP/USB conversion program 43 returns to STEP S203 and repeats the processes.

In STEP S210, the IPP/USB conversion program 43 searches for printers 3 connected to the PC 2 through USB interface.

In STEP S211, the IPP/USB conversion program 43 selects one of the printers 3 searched in STEP S210.

In STEP S212, the IPP/USB conversion program 43 obtains unique apparatus information from the printer 3 selected in STEP S211, through USB. STEP S212 is an example of an obtaining process.

In STEP S213, the IPP/USB conversion program 43 determines whether the unique apparatus information obtained in STEP S212 is in the storage unit 26. In a case where the obtained unique apparatus information is not in the storage unit 26, the IPP/USB conversion program 43 proceeds to STEP S214; whereas in a case where the obtained unique apparatus information is in the storage unit 26, the IPP/USB conversion program 43 proceeds to STEP S219.

Here, the reasons why it is determined whether the unique apparatus information is in the storage unit 26 are as follow. In a case of a printer 3 whose unique apparatus information is in the storage unit 26, since a link has been already added to the template screen data in STEP S207, in order to skip the subsequent processes of STEPS S214 to S218 with respect to the corresponding printer 3 so as not to doubly add the link, the above-described determination is performed. On the other hand, for example, in a case of a printer 3 connected to the PC 2 after STEP S213 of the previous printer selection screen generating process was performed before STEP S213 of the present printer selection screen generating process is performed, the unique apparatus information thereof has not been stored in the storage unit 26, and thus a link has not been added in STEP S207. Therefore, in order to perform STEPS S214 to S218 so as to assign a unique port number to the unique apparatus information of the corresponding printer 3, the above-described determination is performed.

In STEP S214, the IPP/USB conversion program 43 selects a port number from the port numbers of the above-described reserved ports. At this time, the IPP/USB conversion program 43 does not select a port number assigned to the unique apparatus information of any other printer 3. That is, the port number selected here satisfies the following conditions:

The selected port number should be different from the "Well-Known Ports".

The selected port number should not be the same as a port number assigned to the unique apparatus information of any other printer 3.

The port number should not be the same as the port number of any other service being executed in the PC 2.

Next, the IPP/USB conversion program 43 assigns the selected port number to the unique apparatus information obtained in STEP S212.

The above-described STEP S214 is an example of a communication path generating process. The selected port number is an example of a communication path unique for an image processing apparatus. Here, being unique for the image processing apparatus means being different between the plurality of printers 3 connected to the PC 2 through USB interface.

In STEP S215, the IPP/USB conversion program 43 registers the port number assigned in STEP S214, in the OS 41, and registers the IPP/USB conversion program 43 as a service corresponding to the assigned port number in the OS 41. Then, the IPP/USB conversion program 43 generates a socket for monitoring a communication port identified by the assigned port number, and uses the generated socket to monitor a session establishment request (a so-called accept request) from the web browser 42.

In STEP S216, the IPP/USB conversion program 43 generates a URL requesting transmission of the screen data of the setting screen 50 and sets the port number assigned in STEP S214, in the URL.

In STEP S217, the IPP/USB conversion program 43 adds the URL generated in STEP S216, as a link, to the template screen data.

In STEP S218, the IPP/USB conversion program 43 controls the storage unit 26 such that the storage unit stores the unique apparatus information of the printer 3 obtained in STEP S212 and the port number assigned in STEP S214 in association with each other. STEP S218 is an example of a storing process.

In STEP S219, the IPP/USB conversion program 43 determines whether all of the printers 3 searched in STEP S210 have been selected. In a case where all searched printers 3 have been selected, the IPP/USB conversion program 43 proceeds to STEP S220; whereas in a case where there is any unselected printer 3, the IPP/USB conversion program 43 returns to STEP S211 and repeats the processes.

In STEP S220, the IPP/USB conversion program 43 adds a description for displaying the delete button 58 to the template screen data. In this way, the screen data of the printer selection screen 55 is generated.

In STEP S221, the IPP/USB conversion program 43 transmits the generated screen data of the printer selection screen 55 to the web browser 42.

The screen data of the printer selection screen 55 is generated by the printer selection screen generating process, whereby the printer selection screen 55 of FIG. 3 is displayed on the web browser 42. This screen is displayed in a case where a plurality of printers 3 is connected to the PC 2, and the user does not know a communication path for setting of each printer 3. The user can click the model name of a printer 3 on the printer selection screen 55 with the mouse, thereby calling the setting screen 50 of the selected printer 3. At this time, a processing request to be transmitted from the web browser 42 has been written in the form of the URL generated in STEP S206 or S216, and thus the result of the above-described determination of STEP S103 is "NO". That is, the corresponding processing request is transmitted to a printer 3 desired by the user.

(7-3) Communication Process with Printer

Figure 12:
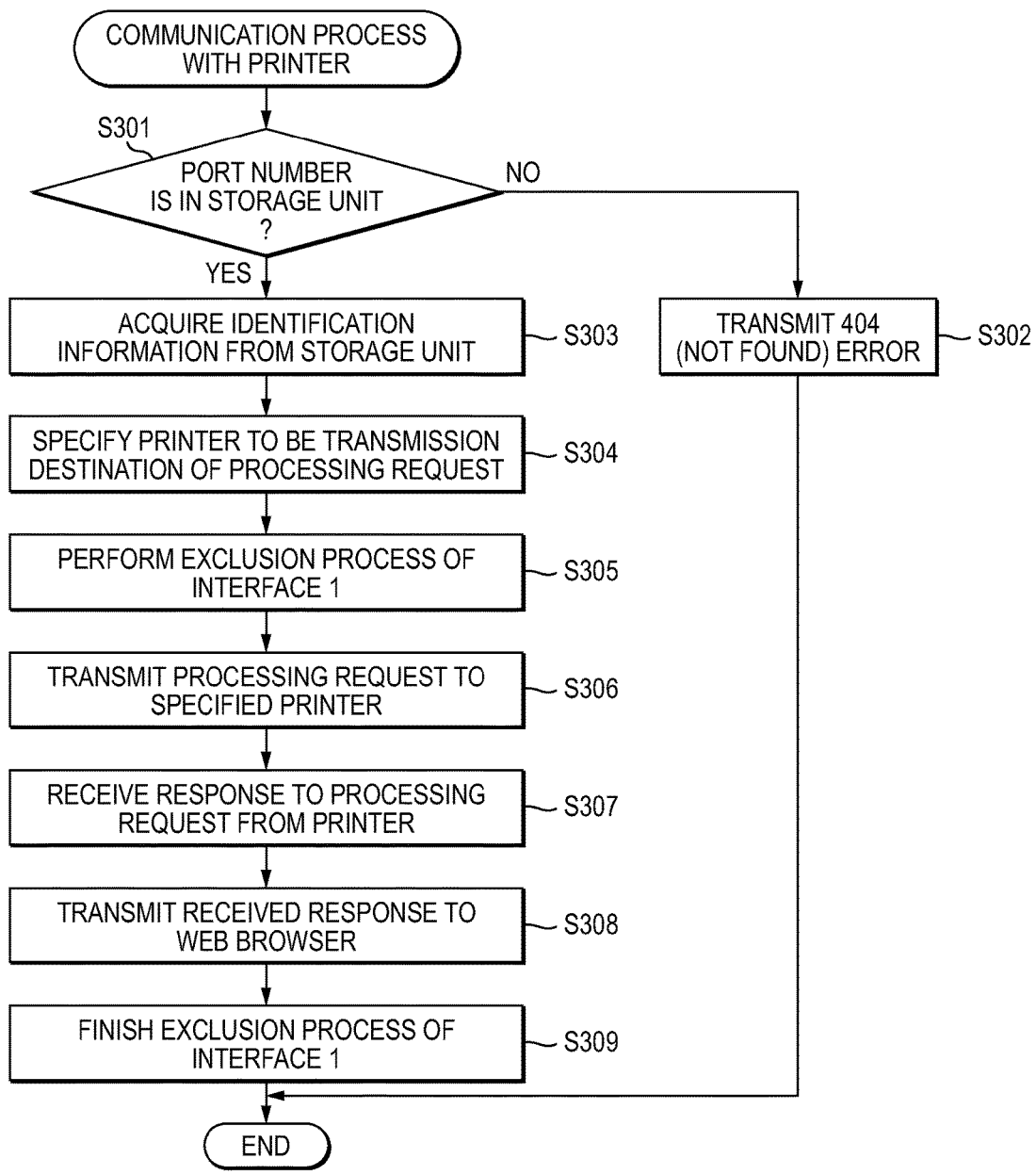
FIG. 12 is a flow chart illustrating a communication process with the printer.

Subsequently, the communication process with a printer 3 which is executed in STEPS S106 and S110 will be described with reference to FIG. 12.

In STEP S301, the IPP/USB conversion program 43 determines whether a particular port number which is the same as the port number of the communication port having received the processing request in STEP S101 is stored in the storage unit 26. In a case where the particular port number is not stored in the storage unit 26, the IPP/USB conversion program 43 proceeds to STEP S302; whereas in a case where the particular port number is stored in the storage unit 26, the IPP/USB conversion program 43 proceeds to STEP S303.

In STEP S302, the IPP/USB conversion program 43 transmits a "404 (Not Found)" error to the web browser 42.

In STEP S303, the IPP/USB conversion program 43 obtains unique apparatus information associated with the particular port number from the storage unit 26.

In STEP S304, the IPP/USB conversion program 43 specifies a printer 3 as the transmission destination of the processing request on the basis of the unique apparatus information obtained in STEP S303. Specifically, for example, the IPP/USB conversion program 43 obtains unique apparatus information from each of the printers 3 connected to the PC 2 through USB interface. Next, the IPP/USB conversion program 43 compares the unique apparatus information obtained from the storage unit 26 in STEP S303 with the unique apparatus information obtained from each printer 3. Then, the IPP/USB conversion program 43 specifies a printer whose unique apparatus information matches with the unique apparatus information obtained from the storage unit 26, as the transmission destination of the processing request.

In STEP S305, the IPP/USB conversion program 43 performs an exclusion process of USB "Interface 1" connected to the printer 3 specified in STEP S304 such that in a case where a plurality of processing requests is received from the web browser 42, the plurality of processing requests are not mixed up.

The exclusion process can be performed, for example, using mutex. The mutex is used for performing an exclusion process and is provided in a program language. Incidentally, a case of performing the exclusion process using the mutex will be described as an example here; however, the method of performing the exclusion process is not limited thereto. For example, the exclusion process may be performed using a semaphore or may be performed by another unique method without using the mutex or a semaphore.

In STEP S306, the IPP/USB conversion program 43 transmits the processing request received in STEP S101 to the printer 3 specified in STEP S304, through "Interface 1".

The above-described STEPS S301 to S306 are one example of a request transmitting process.

In STEP S307, the IPP/USB conversion program 43 receives a response to the processing request transmitted in STEP S306 from the printer 3 through "Interface 1".

In STEP S308, the IPP/USB conversion program 43 transmits the response received in STEP S307 to the web browser 42.

In STEP S309, the IPP/USB conversion program 43 finishes the exclusion process of "Interface 1".

(8) Advantages

The IPP/USB conversion program 43 according to the above-described exemplary embodiment transmits the screen data of the printer selection screen 55 configured such that when the user selects a model name on the printer selection screen 55, a processing request is transmitted from the web browser 42 through a communication port with a port number corresponding to a printer 3 identified by the selected model name, to the web browser 42. Further, upon receiving a processing request from the web browser 42, the IPP/USB conversion program 43 transmits the corresponding processing request to a printer 3 corresponding to the port number of a communication port having received the corresponding processing request.

Therefore, according to the IPP/USB conversion program 43, in a case of relaying communication between the web browser 42 and the plurality of printer 3, it is possible to specify a printer 3 as the transmission destination of a processing request transmitted from the web browser 42.

Further, according to the IPP/USB conversion program 43, the port numbers are generated as communication paths, in a case where a processing request is received from the web browser 42. Therefore, it is possible to specify a printer 3 as transmission data of the processing request according to what is the port number of a communication port having received the processing request.

Further, according to the IPP/USB conversion program 43, in a case where a processing request is received from the web browser 42 through a communication port of a specific network port (specifically, the port number "80"), the screen data of the printer selection screen 55 is transmitted to the web browser 42. For example, in a case where the user of the web browser 42 knows a port number corresponding to a target printer 3, the user can transmit a processing request for which the port number has been designated, thereby transmitting the processing request to the target printer 3 without selecting any one printer 3 on the printer selection screen 55. On the other hand, in a case where the user does not know a port number corresponding to a target printer 3, the user can transmit a processing request for which the port number "80" has been designated, thereby selecting the target printer 3 on the printer selection screen 55.

Furthermore, according to the IPP/USB conversion program 43, the unique apparatus information of each printer 3 and a port number are stored in association with each other in the storage unit 26, in a case where a processing request is received from the web browser 42. Therefore, it is possible to specify a printer 3 as the transmission destination of the corresponding processing request.

Further, according to the IPP/USB conversion program 43, in STEP S205, it is determined whether each of printers 3 identified by the unique apparatus information stored in the storage unit 26 is connected to the PC 2, and in STEPS S206 and S207, screen data for receiving selection of the model name of a printer 3 connected to the PC 3 is generated. Therefore, it is possible to prevent a processing request from being transmitted to a printer 3 disconnected from the PC 2.

Further, according to the IPP/USB conversion program 43, among the printers 3 identified by the unique apparatus information stored in the storage unit 26, in a case of a printer 3 disconnected from the PC 2, the model name of the corresponding printer 3 is displayed on the printer selection screen 55 such that the corresponding model name cannot be selected. Therefore, the user can see printers 3 which had been connected to the PC 2 in the past but are disconnected from the PC 2 at present.

Furthermore, according to the IPP/USB conversion program 43, the user can select the model name of a printer 3 which had been connected to the PC 2 in the past but is disconnected from the PC 2 at present, on the printer selection screen 55, and click the delete button 5, thereby deleting the unique apparatus information of the corresponding printer 3 and the port number associated with the corresponding unique apparatus information from the storage unit 26.

Further, according to the IPP/USB conversion program 43, in a case where the PC 2 and the plurality of printers 3 are connected to each other through USB interface such that communication is possible, it is possible to specify a printer 3 to be the transmission destination of a processing request transmitted from the web browser 42.

Further, according to the IPP/USB conversion program 43, in STEP S211, printers 3 connected to the PC 2 through USB interface are searched, and in a case where the unique apparatus information of a searched printer 3 is not in the storage unit 26, in STEPS S213 and S214, a unique port number is assigned to the unique apparatus information of that searched printer 3. Therefore, it is possible to prevent a port number from being assigned to a printer 3 for which another port number has been already assigned.

Furthermore, according to the IPP/USB conversion program 43, the port number selected in STEP S203 is set in a URL to be added to the printer selection screen 55. Since a port number is uniquely set for the unique apparatus information of each printer 3, it is possible to easily specify the plurality of connected printers 3 by setting port numbers in URLs.

Further, according to the IPP/USB conversion program 43, in STEP S301, it is determined whether the port number of the communication process having received the processing request is in the storage unit 26, and in a case where the particular port number is not in the storage unit 26, the processing request is not transmitted (STEP S302). Therefore, in a case where a port number is deleted from the storage unit, and then a processing request for which the deleted port number has been set is received, it is possible to prevent the corresponding processing request from being transmitted to a printer 3 corresponding to the deleted port number.

Further, in the present exemplary embodiment, there are stored not only port numbers associated with printers 3 which are connected to the PC 2 at present but also port numbers associated with printers 3 which had been connected to the PC 2 in the past, and thus the same port number is prevented from being assigned to different printers. Therefore, even if the power supply of a printer 3 is in an OFF state, a port number for the corresponding printer 3 is not assigned to any other printer 3. Therefore, by setting that port number in a URL indicating the setting screen 50 of a printer 3, for example, even if the corresponding URL is registered in "Favorites" of the web browser 42, regardless of connection and disconnection of the corresponding printer 3, the setting screen 50 of another printer 3 is prevented from being displayed by the URL registered in "Favorites".

<Modifications to Exemplary Embodiments>

The present invention is not limited to the above-described exemplary embodiments. For example, the following modifications are also included in the technical scope.

(1) In the above-described exemplary embodiment, a case of obtaining the unique apparatus information from each printer 3 has been described as an example. On the other hand, the unique apparatus information may not be information obtained from each printer 3. For example, information for identifying a USB port connected to each printer 3 may be used as the unique apparatus information identifying the corresponding printer 3.

(2) In the above-described exemplary embodiment, a case where the IPP/USB conversion program 43 receives a response from a printer 3 and transmits the received response to the web browser 42 has been described as an example. On the other hand, in a case of unilaterally transmitting a processing request from the web browser 42 to a printer 3, the IPP/USB conversion program 43 may not transmit a response to the web browser 42.

(3) In the above-described exemplary embodiment, as an example of a communication interface, USB has been described. However, the communication interface is not limited to USB. For example, the PC 2 and the printers 3 may perform communication with each other according to IEEE 1284, which is a known communication standard for printers.

(4) In the above-described exemplary embodiment, a case of using the port numbers to identify the printers 3 has been described as an example. On the other hand, communication paths may be generated on the basis of information defined by image processing apparatuses. An example in which a folder name of the inside of each printer 3 is used to identify the corresponding printer 3 will be described.

Specifically, for example, the IPP/USB conversion program 43 obtains the model name, vendor ID, product ID and serial number of each printer 3 from the descriptors stored in the USB client interface unit 32, and generates the following folder name on the basis of the obtained information.

Model Name_Vendor ID_Product ID_Serial Number

It is assumed that the above-described model name, vendor ID, product ID and serial number are read as information obtained from the descriptors, respectively. For example, it is assumed that the model name, vendor ID, product ID and serial number of the printer 3a are "PRINTER3a", "04F9", "00A3" and "SER1111", respectively.

In this case, the folder name is the following folder name.
PRINTER3a_VID04F9_PID00A3_SER1111

Subsequently, the IPP/USB conversion program 43 adds the following link including the generated folder name to the above-described screen data of the printer selection screen 55.

<a href="http://localhost/PRINTER3a_VID04F9_PID00A3_SER1111/main.html">PRINTER3a</a>

Then, upon the user clicks the corresponding link on the web browser 42, the following processing request is transmitted from the web browser 42 to the IPP/USB conversion program 43.

GET /PRINTER3a_VID04F9_PID00A3_SER1111/main.html HTTP/1.0

The IPP/USB conversion program 43 is able to extract the folder name "PRINTER3a_VID04_F9_PID00A3_SER1111" from the processing request, and specify a printer 3 whose model name, vendor ID, product ID and serial number match with those of the corresponding folder name, as the transmission destination of the processing request.

On the other hand, with respect to an HTTP request, the printer 3 has a virtual folder which includes the model name, the vendor ID, the product ID and the serial number and is as follows.

PRINTER3a_VID04F9_PID00A3_SER1111

Then, it is assumed that the above-described processing request "GET /PRINTER3a_VID04F9_PID00A3_SER1111/main.html HTTP/1.0" is transmitted. In this case, the web server function 62 analyzes the above-described HTTP request as a command for obtaining a file "main.html" which is under the virtual folder "/PRINTER3a_VID04F9_PID00A3_SER1111". Therefore, the web server function 62 returns the file "main.html".

Incidentally, here, as an example of a folder name, a character string which is a sequence of a model name, a vendor ID, a product ID and a serial number has been described. However, folder names may include information capable of identifying the plurality of printers 3 connected to the PC 2 through USB interface from each other. For example, in a case where it is possible to identify the printers 3 from each other only by their serial numbers, the folder names may include only the serial numbers. For example, if the serial numbers are obtained from the individual printers 3 and each of the obtained serial numbers is unique, it is possible to identify the printers 3 in accordance with only the serial numbers.

The virtual folder of each printer 3 is just handled to be stored in a corresponding directory by the web server function 62 and may include a file which is not located on the file system of the storage unit 35. However, this process is known as a CGI function included in a web server function 52 and thus will not be described in detail.

In this example, a folder name is used as a communication path, and thus the communication path can be set to a word meaningful to the user. Therefore, there is also an advantage in which it is easy for the user to understand correspondence between communication paths and the printers 3.

(5) In the above-described exemplary embodiment, as an example of the image processing apparatus, the printer 3 has been described. On the other hand, the image processing apparatus may be so-called a multi-function apparatus having a printing function, a scanner function, a copying function, a facsimile function, and so on. Further, the image processing apparatus may have a single function of the image reading apparatus or the facsimile.

(6) In the above-described exemplary embodiment, a case where the control unit 31 has one CPU 31a has been described as an example. On the other hand, the control unit 31 may be configured by one or more CPUs, or may be configured by an ASIC, or may be configured by a combination of one or more CPUs and an ASIC.

(7) In the above-described exemplary embodiment, each printer is configured so as not to request a plurality of request data items in a signal session according to a KeepAlive specification. However, even after response transmission finishes, sockets can be used without being discarded, whereby it is possible to cope with the KeepAlive specification.

(8) In the above-described exemplary embodiment, the reserved ports are reserved in advance, and are always monitored. However, whenever a new port is assigned in STEP S214, the corresponding port may be added to monitored ports.

(9) In the above-described exemplary embodiment, the client application may be not only the web browser 42 but also the spooler 44 using IPP. In this case, it may be determined whether the client application is the web browser 42, and in a case where the client application is the web browser 42, the screen data of the setting screen 50 may be returned, and in a case where the client application is the spooler 44, the screen data of the setting screen 50 may not be returned. This is because even if the screen data is received, the spooler 44 cannot display the screen. In this case, the web browser 42 is an example of the specific application.

That is, in a case where the client application is the specific application, the IPP/USB conversion program 43 may transmit the screen data of the printer selection screen 55; whereas in a case where the client application is any other application, the IPP/USB conversion program 43 may not transmit the screen data. Therefore, it is possible to prevent the screen data of the printer selection screen 55 from being transmitted to an application incapable of displaying the screen.

Incidentally, contrary to the above-described example, in a case where the client application is the spooler 44, the IPP/USB conversion program 43 may return the screen data of the printer selection screen 55; whereas in a case where the client application is the web browser 42, the IPP/USB conversion program 43 may not return the screen data. In this case, the spooler 44 is an example of the specific application.

Incidentally, the specific application is not limited to the web browser 42, and may be any other application as long as the corresponding application can display the screen data of the printer selection screen 55.

(10) In the above-described exemplary embodiment, the printer selection screen generating process of STEP S104 is performed in a case where the port number of the processing request is "80"; however, it may be performed when a new printer 3 is connected to the PC 2 through USB interface.

(11) In the above-described exemplary embodiment, in a case where it is determined in STEP S301 that the port number is not in the storage unit 26, in STEP S302, the IPP/USB conversion program 43 transmits a "404 (Not Found)" error to the web browser 42. However, instead of the process of STEP S302, the processes of STEPS S104 and S105 may be performed.

That is, in a case where it is not possible to specify a printer 3 according to the port number designated by the processing request received from the web browser 42, the IPP/USB conversion program 43 may transmit the screen data of the printer selection screen 55 to the web browser 42.

Therefore, for example, in a case where the user designates the port number of a printer 3 disconnected from the PC 2 and requests transmission of the setting screen 50, the screen data of the printer selection screen 55 is transmitted, and thus it is possible to reselect a printer 3.

What is claimed is:

1. A non-transitory computer-readable medium having a communication relaying program stored thereon and readable by a computer of an information processing apparatus, which is configured to be connectable to a plurality of image processing apparatuses through a Universal Serial Bus (USB) communication interface, wherein the communication relaying program, when executed by the computer, causes the information processing apparatus to:
   receive, from a client application, a first processing request designating a first network port having a first port number and an Internet Protocol (IP) address of the information processing apparatus;
   determine whether the first port number of the first processing request is a default port number for Hypertext Transfer Protocol, the default port number being 80;
   in a case where the first port number is the default port number and the first processing request designates the IP address of the information processing apparatus, generate selection screen information for displaying a screen that allows a user to select one of the plurality of image processing apparatuses, wherein generation of the selection screen information comprises:
      selecting a particular image processing apparatus to acquire, from the particular image processing apparatus through the USB communication interface, particular apparatus information that is unique for the particular image processing apparatus;
      selecting a second network port, having a second port number, from a plurality of ports reserved for the communication relaying program;
      assigning the second network port to the particular apparatus information such that the second network port is uniquely assigned to the particular image processing apparatus;
      generating a uniform resource locator comprising the second port number and a hostname associated with the IP address of the information processing apparatus;
      adding the uniform resource locator to template screen data that is used for generating the selection screen information; and
      storing, in a storage device, the particular apparatus information in association with the second port number;
   transmit the selection screen information to the client application;
   receive, from the client application, a second processing request designating the second network port having the second port number;
   determine whether the second port number of the second processing request is the default port number;
   in a case where the second port number is not the default port number, read, from the storage device, the particular apparatus information associated with the second port number; and
   in response to reading the particular apparatus information, transmit, through the USB communication interface using Internet Printing Protocol over USB, the second processing request to the particular image processing apparatus that is identified by the particular apparatus information, wherein the second processing request comprises a request for setting screen data for a setting screen that allows a user to select a setting.

2. The non-transitory computer-readable medium according to claim 1,
   wherein the client application is a specific application executed by the computer of the information processing apparatus.

3. The non-transitory computer-readable medium according to claim 2,
   wherein the specific application is a web browser.

4. The non-transitory computer-readable medium according to claim 1,
   wherein the information processing apparatus is configured to be connectable to each of the plurality of the image processing apparatuses through a respective one of a plurality of communication interfaces,
   wherein the communication relaying program, when executed by the computer, further causes the information processing apparatus to:
      store unique apparatus information for each of the plurality of image processing apparatuses; and
      determine, for each of the plurality of image processing apparatuses, whether an image processing apparatus identified by unique apparatus information stored in the storing device is connected to the information processing apparatus, and
   wherein the screen allows the user to select one of a group of the plurality of the image processing apparatuses determined to be connected to the information processing apparatus.

5. The non-transitory computer-readable medium according to claim 4,
   wherein the selection screen information causes the screen to display at least one non-selectable option for at least one of a group of the plurality of image processing apparatuses determined to be disconnected from the information processing apparatus.

6. The non-transitory computer-readable medium according to claim 1, wherein the selection screen information causes the screen to display a delete button for receiving an instruction for deleting, from the storage device, the particular apparatus information in association with the second port number, and wherein the communication relaying program, when executed by the computer, further causes the information processing apparatus to:

receive a communication path delete request from the client application in response to selection of the delete button; and delete the second port number and the particular apparatus information from the storage device in a case where the communication path delete request is received.

7. The non-transitory computer-readable medium according to claim 1, wherein the communication relaying program, when executed by the computer, further causes the information processing apparatus to:

obtain the setting screen data from the particular image processing apparatus in response to transmitting the second processing request; and transmit the setting screen data to the client application.

8. The non-transitory computer-readable medium according to claim 7, wherein the setting screen data is obtained from the particular image processing apparatus via the USB communication interface.

9. The non-transitory computer-readable medium according to claim 1, wherein the second processing request designates the IP address of the information processing apparatus and the second network port.

10. A communication relaying apparatus comprising:

a communication unit configured to perform communication with a plurality of image processing apparatuses through a Universal Serial Bus (USB) communication interface;

a processor; and a memory storing a computer program that, when executed by the processor, causes the communication relaying apparatus to:

receive, from a client application, a first processing request designating a first network port having a first port number and an Internet Protocol (IP) address of the communication relaying apparatus;

determine whether the first port number of the first processing request is a default port number for Hypertext Transfer Protocol, the default port number being 80;

in a case where the first port number is the default port number and the first processing request designates the IP address of the communication relaying apparatus, generate selection screen information for displaying a screen that allows a user to select one of the plurality of image processing apparatuses, wherein generation of the selection screen information comprises:

selecting a particular image processing apparatus to acquire, from the particular image processing apparatus through the USB communication interface, particular apparatus information that is unique for the particular image processing apparatus;

selecting a second network port, having a second port number, from a plurality of ports reserved for the computer program;

assigning the second network port to the particular apparatus information such that the second network port is uniquely assigned to the particular image processing apparatus;

generating a uniform resource locator comprising the second port number and a hostname associated with the IP address of the communication relaying apparatus;

adding the uniform resource locator to template screen data that is used for generating the selection screen information; and storing, in a storage device, the particular apparatus information in association with the second port number;

transmit the selection screen information to the client application;

receive, from the client application, a second processing request designating the second network port having the second port number;

determine whether the second port number of the second processing request is the default port number;

in a case where the second port number is not the default port number, read, from the storage device, the particular apparatus information associated with the second port number; and in response to reading the particular apparatus information, transmit, through the USB communication interface using Internet Printing Protocol over USB, the second processing request to the particular image processing apparatus that is identified by the particular apparatus information, wherein the second processing request comprises a request for setting screen data for a setting screen that allows a user to select a setting.

11. The non-transitory computer-readable medium of claim 1, wherein the generation of the selection screen information includes sequentially retrieving identification information for each of the plurality of image processing apparatuses, wherein first identification information for a first image processing apparatus is read prior to reading second identification information for a second image processing apparatus.

12. The communication relaying apparatus of claim 10, wherein the generation of the selection screen information includes sequentially retrieving identification information for each of the plurality of image processing apparatuses, wherein first identification information for a first image processing apparatus is read prior to reading second identification information for a second image processing apparatus.

13. A method, comprising:

receiving, from a client application executed by an information processing apparatus that is configured to execute a computer program and selectively connect to a plurality of image processing apparatuses through a Universal Serial Bus (USB) communication interface, a first processing request designating a first network port having a first port number and an Internet Protocol (IP) address of the information processing apparatus;

determining, by the information processing apparatus, whether the first port number of the first processing request is a default port number for Hypertext Transfer Protocol, the default port number being 80;

in a case where the first port number is the default port number and the first processing request designates the IP address of the information processing apparatus, generating selection screen information for displaying a screen that allows a user to select one of the plurality of image processing apparatuses, wherein the generating the selection screen information comprises:
  selecting a particular image processing apparatus to acquire, from the particular image processing apparatus through the USB communication interface, particular apparatus information that is unique for the particular image processing apparatus;
  selecting a second network port, having a second port number, from a plurality of ports reserved for the computer program;
  assigning the second network port to the particular apparatus information such that the second network port is uniquely assigned to the particular image processing apparatus;
  generating a uniform resource locator comprising the second port number and a hostname associated with the IP address of the information processing apparatus;
  adding the uniform resource locator to template screen data that is used for generating the selection screen information; and
  storing, in a storage device, the particular apparatus information in association with the second port number;
transmitting the selection screen information to the client application;
receiving, from the client application, a second processing request designating the second network port having the second port number;
determining whether the second port number of the second processing request is the default port number;
in a case where the second port number is not the default port number, reading, from the storage device, the particular apparatus information associated with the second port number; and
in response to the reading the particular apparatus information, transmitting, through the USB communication interface using Internet Printing Protocol over USB, the second processing request to the particular image processing apparatus that is identified by the particular apparatus information, wherein the second processing request comprises a request for setting screen data for a setting screen that allows a user to select a setting.

14. The method of claim 13, further comprising:
after the selecting the particular image processing apparatus, selecting, by the information processing apparatus, a second image processing apparatus of the image processing apparatuses to acquire, from the second image processing apparatus through the USB communication interface, second apparatus information that is unique for the second image processing apparatus, and assigning a third network port, having a third port number, to the second apparatus information such that the third network port is uniquely assigned to the second image processing apparatus.

15. The method of claim 13, further comprising:
after searching for the plurality of image processing apparatuses connected to the information processing apparatus, sequentially selecting, one at a time, each of the image processing apparatuses to acquire corresponding apparatus information that is unique for each of the image processing apparatuses and sequentially assigning a unique network port to each of the image processing apparatuses.

16. The non-transitory computer-readable medium according to claim 1, wherein the first processing request comprises the following: localhost.

17. The non-transitory computer-readable medium according to claim 1,
wherein the selection screen information comprises the uniform resource locator for the particular image processing apparatus and an additional uniform resource locator for an additional image processing apparatus of the plurality of image processing apparatuses,
wherein the additional uniform resource locator comprises a third port number and the hostname associated with the IP address of the information processing apparatus, the third port number being different from the second port number.

18. The non-transitory computer-readable medium according to claim 1,
wherein the selection screen information comprises a plurality of links that are associated with names of the plurality of image processing apparatuses, respectively,
wherein each of the plurality of links comprises a common address and a unique port number, and
wherein the screen displays the names of the plurality of image processing apparatuses without displaying the common address and the unique port number for each of the plurality of links.

19. The non-transitory computer-readable medium according to claim 1,
wherein the screen that allows the user to select one of the plurality of image processing apparatuses comprises:
  a first name for a first image processing apparatus, the first image processing apparatus being the particular image processing apparatus, and the first name being obtained from the particular apparatus information and being associated with a first link comprising the second port number and the hostname associated with the IP address of the information processing apparatus; and
  a second name for a second image processing apparatus of the plurality of image processing apparatuses, the second name being obtained from additional apparatus information acquired from the second image processing apparatus and being associated with a second link comprising a third port number and the hostname associated with the IP address of the information processing apparatus, the third port number being different from the second port number.

20. The non-transitory computer-readable medium according to claim 1, wherein the generation of the selection screen information further comprises:
  selecting a second particular image processing apparatus to acquire, from the second particular image processing apparatus through the USB communication interface, second particular apparatus information that is unique for the second particular image processing apparatus;
  assigning a third network port, having a third port number, to the second particular apparatus information such that the third network port is uniquely assigned to the second particular image processing apparatus;
  generating a second uniform resource locator comprising the third port number and the hostname associated with the IP address of the information processing apparatus; and adding the second uniform resource locator to the template screen data that is used for generating the selection screen information.

\* \* \* \* \*